US012320425B2

(12) United States Patent
Crump et al.

(10) Patent No.: US 12,320,425 B2
(45) Date of Patent: Jun. 3, 2025

(54) TOOTH JUMP PROTECTION DEVICE

(71) Applicant: BorgWarner Inc., Auburn Hills, MI (US)

(72) Inventors: Matthew W. Crump, Cortland, NY (US); Christopher Van Loon, Ithaca, NY (US); Sean R. Simmons, Ithaca, NY (US); Timothy K. White, Sterling Heights, MI (US); Joseph P. Goodsell, Groton, NY (US); Bradley F. Adams, Homer, NY (US)

(73) Assignee: BorgWarner Inc., Auburn Hills, MI (US)

( * ) Notice: Subject to any disclaimer, the term of this patent is extended or adjusted under 35 U.S.C. 154(b) by 591 days.

(21) Appl. No.: 17/648,617

(22) Filed: Jan. 21, 2022

(65) Prior Publication Data
US 2022/0235852 A1 Jul. 28, 2022

Related U.S. Application Data

(60) Provisional application No. 63/218,129, filed on Jul. 2, 2021, provisional application No. 63/140,448, filed on Jan. 22, 2021.

(51) Int. Cl.
F16H 7/18 (2006.01)
F16H 7/06 (2006.01)
F16H 7/08 (2006.01)

(52) U.S. Cl.
CPC .............. *F16H 7/18* (2013.01); *F16H 7/06* (2013.01); *F16H 2007/081* (2013.01);
(Continued)

(58) Field of Classification Search
CPC ..... F16H 7/00; F16H 7/06; F16H 7/08; F16H 2007/081; F16H 2007/0804; F16H 2007/0842; F16H 2007/0844; F16H 2007/0846; F16H 2007/0863; F16H 2007/0865; F16H 2007/0872; F16H 2007/0874; F16H 2007/0893; F16H 7/18;
(Continued)

(56) References Cited

U.S. PATENT DOCUMENTS 1,579,681 A 4/1926 John
1,892,067 A 12/1932 Douglas
(Continued)

FOREIGN PATENT DOCUMENTS

CN 2859091 1/2007
CN 109667898 A 4/2019
(Continued)

OTHER PUBLICATIONS

Bonart, Jakob et al., "Enhancing End-of-Line Defect Classifications and Evaluating Early Testability for Inline Test Stands Using NVH Measurements", 2021, IEEE. (Year: 2021).
(Continued)

*Primary Examiner* — Henry Y Liu
*Assistant Examiner* — Raveen J Dias
(74) *Attorney, Agent, or Firm* — Brown & Michaels, PC

(57) ABSTRACT

A tooth jump protection device is used to control chain slack and delay the torque at which chain jump occurs, thus increasing jump torque performance. The tooth jump protection device is preferably mounted to the transfer case.

35 Claims, 14 Drawing Sheets

(52) U.S. Cl.
CPC ............. *F16H 2007/0842* (2013.01); *F16H 2007/0872* (2013.01); *F16H 2007/0874* (2013.01); *F16H 2007/185* (2013.01)

(58) Field of Classification Search
CPC .... F16H 2007/185; F02B 67/04; F02B 67/06; B60K 17/342; B60K 17/344; B60K 23/00; B60K 57/05
See application file for complete search history.

(56) References Cited

U.S. PATENT DOCUMENTS

| | | | |
|---|---|---|---|
| 2,129,107 A | 9/1938 | Taylor | |
| 2,191,946 A | 2/1940 | John | |
| 2,210,276 A * | 8/1940 | Bremer | F16H 7/0848 474/111 |
| 2,355,003 A | 8/1944 | Mccann | |
| 2,601,789 A * | 7/1952 | Riopelle | F16H 7/18 474/140 |
| 2,766,634 A * | 10/1956 | Frank | F16F 7/00 474/146 |
| 3,334,524 A | 8/1967 | Chalk | |
| 3,441,009 A | 4/1969 | Rafanelli | |
| 3,455,178 A | 7/1969 | Ruoff et al. | |
| 3,656,361 A | 4/1972 | Honda | |
| 3,673,884 A | 7/1972 | Southiere | |
| 3,817,113 A | 6/1974 | Pfarrwaller | |
| 4,069,719 A | 1/1978 | Cancilla | |
| 4,337,055 A | 6/1982 | Mackay et al. | |
| 4,457,741 A | 7/1984 | Hoeptner, III | |
| 4,662,862 A | 5/1987 | Matson | |
| 4,869,708 A | 9/1989 | Hoffmann et al. | |
| 5,000,724 A | 3/1991 | Reid | |
| 5,049,114 A | 9/1991 | Hayden | |
| 5,122,098 A | 6/1992 | Kanehira | |
| 5,180,340 A | 1/1993 | Vahabzadeh et al. | |
| 5,234,381 A | 8/1993 | Vahabzadeh et al. | |
| 5,286,234 A | 2/1994 | Young | |
| 5,306,212 A * | 4/1994 | Eberle | B65G 39/20 474/140 |
| 5,320,582 A * | 6/1994 | Takeda | F16H 7/06 74/89.21 |
| 5,445,568 A | 8/1995 | Fukuzawa et al. | |
| 5,524,725 A | 6/1996 | Schantzen | |
| 5,730,674 A | 3/1998 | Ott | |
| 5,776,024 A | 7/1998 | White et al. | |
| 5,797,818 A * | 8/1998 | Young | F16H 7/18 474/111 |
| 5,846,150 A | 12/1998 | Wigsten | |
| 5,938,551 A * | 8/1999 | Warner | F16H 7/1263 474/111 |
| 5,961,411 A | 10/1999 | Tsutsumi et al. | |
| 5,967,922 A | 10/1999 | Ullein et al. | |
| 6,062,998 A | 5/2000 | Kumakura et al. | |
| 6,117,034 A | 9/2000 | Vine | |
| 6,129,644 A | 10/2000 | Inoue | |
| 6,240,887 B1 * | 6/2001 | Tosaka | F02B 75/243 123/90.31 |
| 6,302,816 B1 * | 10/2001 | Wigsten | F16H 7/18 474/140 |
| 6,322,470 B1 * | 11/2001 | Markley | F16H 7/08 474/122 |
| 6,358,169 B1 | 3/2002 | Markley | |
| 6,375,587 B1 | 4/2002 | Wigsten | |
| 6,412,464 B1 * | 7/2002 | Schneider | F02B 75/22 123/90.31 |
| 6,440,020 B1 | 8/2002 | Tada | |
| 6,572,502 B1 | 6/2003 | Young et al. | |
| 6,599,209 B1 | 7/2003 | Ullein et al. | |
| 6,849,015 B2 * | 2/2005 | Markley | F16H 7/0848 474/140 |
| 7,063,635 B2 | 6/2006 | Garcia | |
| 7,597,640 B2 | 10/2009 | Markley et al. | |
| 7,641,577 B2 | 1/2010 | Markley et al. | |
| 8,348,792 B2 | 1/2013 | He | |
| 8,900,079 B2 | 12/2014 | Mori et al. | |
| 9,482,336 B2 | 11/2016 | Utaki | |
| 9,534,516 B2 | 1/2017 | Utaki | |
| 9,759,292 B2 | 9/2017 | Moura et al. | |
| 9,797,483 B2 | 10/2017 | Kurono et al. | |
| 10,017,204 B2 * | 7/2018 | Kim | B62D 5/0403 |
| 10,054,213 B1 * | 8/2018 | Alexiou | B60K 17/344 |
| 10,487,921 B2 * | 11/2019 | Voges | F02F 1/24 |
| 10,612,630 B2 | 4/2020 | Konno et al. | |
| 11,796,040 B2 * | 10/2023 | Crump | F16H 7/06 |
| 12,078,245 B2 * | 9/2024 | Crump | G06F 30/17 |
| 2002/0042316 A1 * | 4/2002 | Young, Jr. | B62J 13/00 474/140 |
| 2002/0045503 A1 | 4/2002 | Young et al. | |
| 2002/0115511 A1 | 8/2002 | Tada | |
| 2002/0160868 A1 * | 10/2002 | Wigsten | F16H 7/18 474/140 |
| 2003/0062015 A1 | 4/2003 | Garza | |
| 2003/0228948 A1 | 12/2003 | Garbagnati et al. | |
| 2004/0005952 A1 * | 1/2004 | Bachmair | F01L 1/02 474/140 |
| 2004/0067806 A1 | 4/2004 | Markley et al. | |
| 2005/0075204 A1 | 4/2005 | Cholewczynski | |
| 2005/0085322 A1 * | 4/2005 | Markley | F16H 7/18 474/101 |
| 2005/0107196 A1 | 5/2005 | Konno et al. | |
| 2006/0100047 A1 | 5/2006 | Churchill et al. | |
| 2006/0270502 A1 | 11/2006 | Markley et al. | |
| 2006/0293134 A1 | 12/2006 | Markley et al. | |
| 2007/0093328 A1 | 4/2007 | Markley | |
| 2008/0070731 A1 * | 3/2008 | Vrsek | F16H 7/1281 474/134 |
| 2009/0111629 A1 | 4/2009 | Kobara et al. | |
| 2009/0143177 A1 | 6/2009 | Nakano et al. | |
| 2009/0156339 A1 * | 6/2009 | Yokoyama | F16H 7/18 474/111 |
| 2009/0205206 A1 * | 8/2009 | Markley | F16H 7/08 474/140 |
| 2009/0275430 A1 | 11/2009 | Markley | |
| 2009/0325750 A1 | 12/2009 | Wigsten et al. | |
| 2010/0203991 A1 | 8/2010 | He | |
| 2010/0210384 A1 | 8/2010 | Young et al. | |
| 2010/0248876 A1 | 9/2010 | Kroon et al. | |
| 2011/0077114 A1 * | 3/2011 | Markley | F16H 7/0848 474/111 |
| 2012/0129636 A1 | 5/2012 | Lee et al. | |
| 2012/0225744 A1 | 9/2012 | Markley | |
| 2013/0059686 A1 * | 3/2013 | Markley | F16H 7/08 474/111 |
| 2013/0059687 A1 | 3/2013 | Markley | |
| 2015/0330482 A1 * | 11/2015 | Todd | F16H 7/0836 474/109 |
| 2016/0084358 A1 * | 3/2016 | Yuan | F16H 9/24 474/148 |
| 2016/0102736 A1 | 4/2016 | Suchecki | |
| 2016/0102738 A1 | 4/2016 | Vopelius-Feldt et al. | |
| 2016/0186840 A1 | 6/2016 | Cipollone et al. | |
| 2016/0238104 A1 * | 8/2016 | Vroman | F16H 7/18 |
| 2016/0265632 A1 | 9/2016 | Young et al. | |
| 2017/0009849 A1 | 1/2017 | Stiglmaier et al. | |
| 2017/0108111 A1 * | 4/2017 | Steward | F16H 57/0457 |
| 2017/0276216 A1 | 9/2017 | Perissinotto et al. | |
| 2018/0163848 A1 | 6/2018 | Quinn et al. | |
| 2018/0266312 A1 * | 9/2018 | Iwagami | F16H 7/08 |
| 2018/0274674 A1 * | 9/2018 | Werny | G01L 5/042 |
| 2018/0334928 A1 | 11/2018 | Yamauchi et al. | |
| 2019/0003558 A1 | 1/2019 | Kumar et al. | |
| 2019/0071286 A1 | 3/2019 | Dong et al. | |
| 2019/0072175 A1 | 3/2019 | Klar et al. | |
| 2020/0157976 A1 | 5/2020 | Takahashi et al. | |
| 2021/0262552 A1 | 8/2021 | Seki et al. | |
| 2022/0235851 A1 * | 7/2022 | Crump | F16H 7/18 |
| 2022/0235852 A1 | 7/2022 | Crump et al. | |
| 2022/0325783 A1 | 10/2022 | Schroeder et al. | |
| 2023/0104355 A1 * | 4/2023 | Pennazza | F16H 7/08 474/112 |

(56) References Cited

U.S. PATENT DOCUMENTS

| | | | |
|---|---|---|---|
| 2023/0383819 A1 | 11/2023 | Crump et al. | |
| 2023/0407949 A1 * | 12/2023 | Crump | F16H 7/18 |
| 2024/0026956 A1 | 1/2024 | Crump et al. | |

FOREIGN PATENT DOCUMENTS

| | | | | |
|---|---|---|---|---|
| DE | 4327314 A1 | 2/1994 | | |
| DE | 10014333 A1 | 3/2001 | | |
| DE | 102004013696 A1 | 10/2005 | | |
| DE | 102005004186 A1 * | 8/2006 | | B62D 5/0424 |
| DE | 102006025890 A1 | 12/2007 | | |
| DE | 102006055645 A1 * | 5/2008 | | F01L 1/02 |
| DE | 112015002425 | 3/2017 | | |
| DE | 112017000089 | 5/2018 | | |
| DE | 102020104887 A1 | 8/2021 | | |
| EP | 1070875 A3 | 4/2001 | | |
| EP | 1164312 A3 | 6/2007 | | |
| EP | 2589773 A1 * | 5/2013 | | F02B 67/06 |
| GB | 2206175 A | 12/1988 | | |
| JP | S4993493 U | 8/1974 | | |
| JP | S5121782 U | 2/1976 | | |
| JP | s54133272 A | 10/1979 | | |
| JP | S54133272 U | 10/1979 | | |
| JP | S56173248 | 7/1985 | | |
| JP | H03134351 A | 6/1991 | | |
| JP | H06280608 A | 10/1994 | | |
| JP | H07247858 A | 9/1995 | | |
| JP | H08184358 A * | 7/1996 | | F16H 2007/185 |
| JP | 2000274501 A | 10/2000 | | |
| JP | 3383825 B2 | 3/2003 | | |
| JP | 2003240061 A * | 8/2003 | | F16G 13/02 |
| JP | 200428218 | 1/2004 | | |
| JP | 2005042757 A | 2/2005 | | |
| JP | 2005042779 A | 2/2005 | | |
| JP | 2005075122 A | 3/2005 | | |
| JP | 2006138471 A | 6/2006 | | |
| JP | 2008143249 A | 6/2008 | | |
| JP | 2010014044 A * | 1/2010 | | F01L 1/024 |
| JP | 201213190 | 1/2012 | | |
| JP | 2014066322 A | 4/2014 | | |
| JP | 2019120243 A | 7/2019 | | |
| WO | WO-0026532 A1 * | 5/2000 | | F02B 67/06 |
| WO | 2020068048 A1 | 4/2020 | | |
| WO | 2020157457 A1 | 8/2020 | | |
| WO | WO-2022186336 A1 * | 9/2022 | | F16H 7/12 |

OTHER PUBLICATIONS

Conwell, James C. et al., "Design, Construction and Instrumentation of a Machine to Measure Tension and Impact Forces in Roller Chain Drives", Feb. 27, 1995, Mech. Mach. Theory vol. 31, No. 4, Elsevier Science Ltd. (Year: 1995).

* cited by examiner

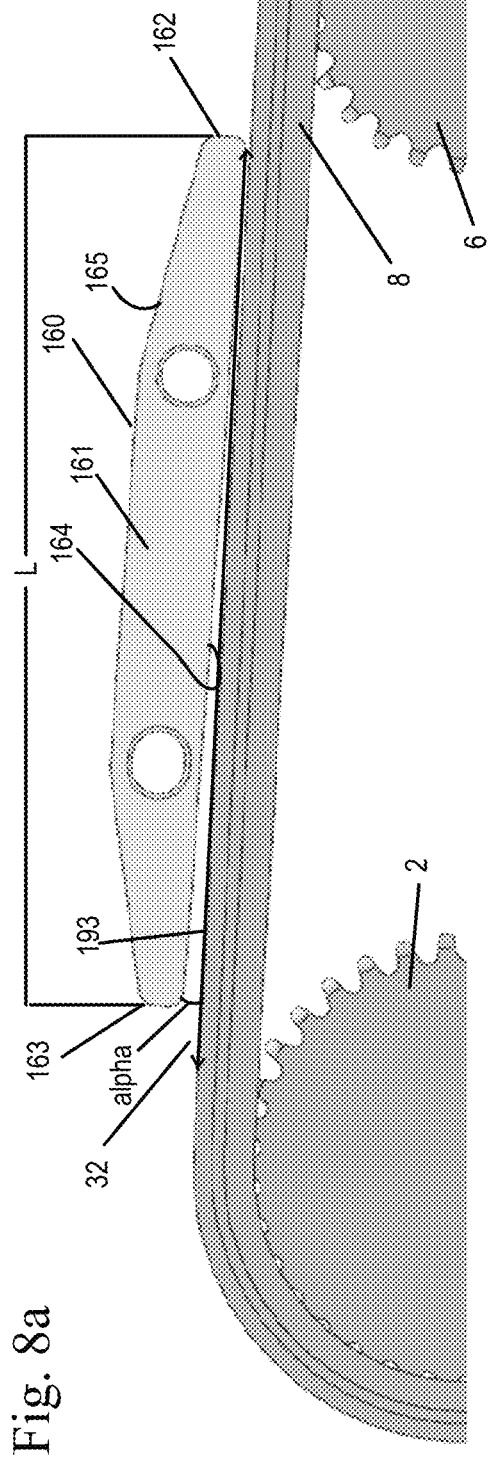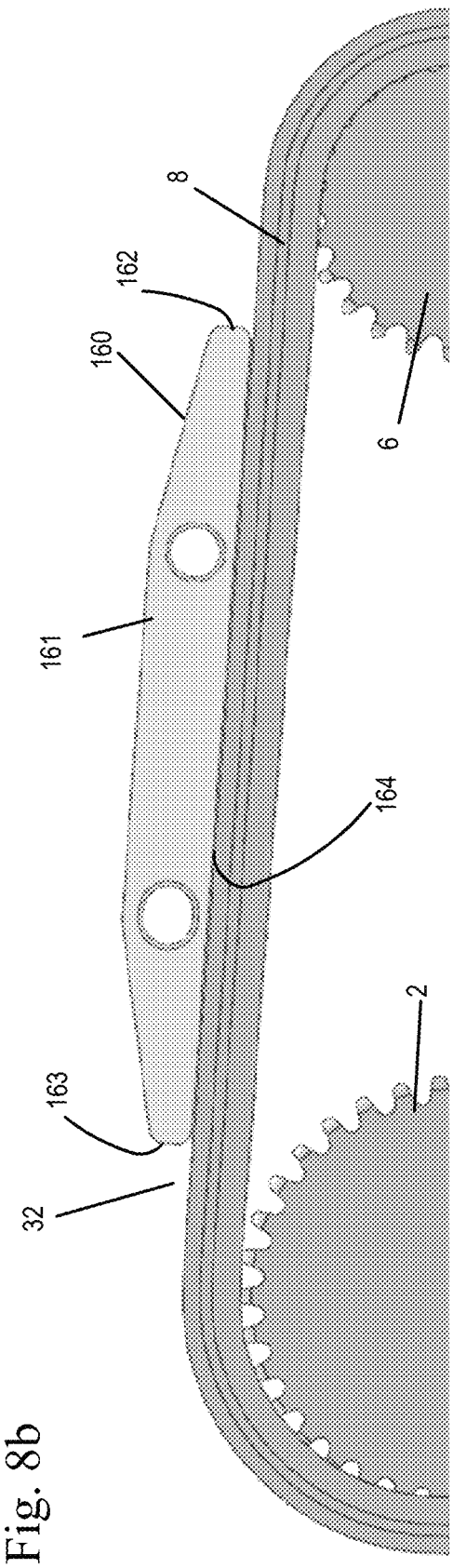

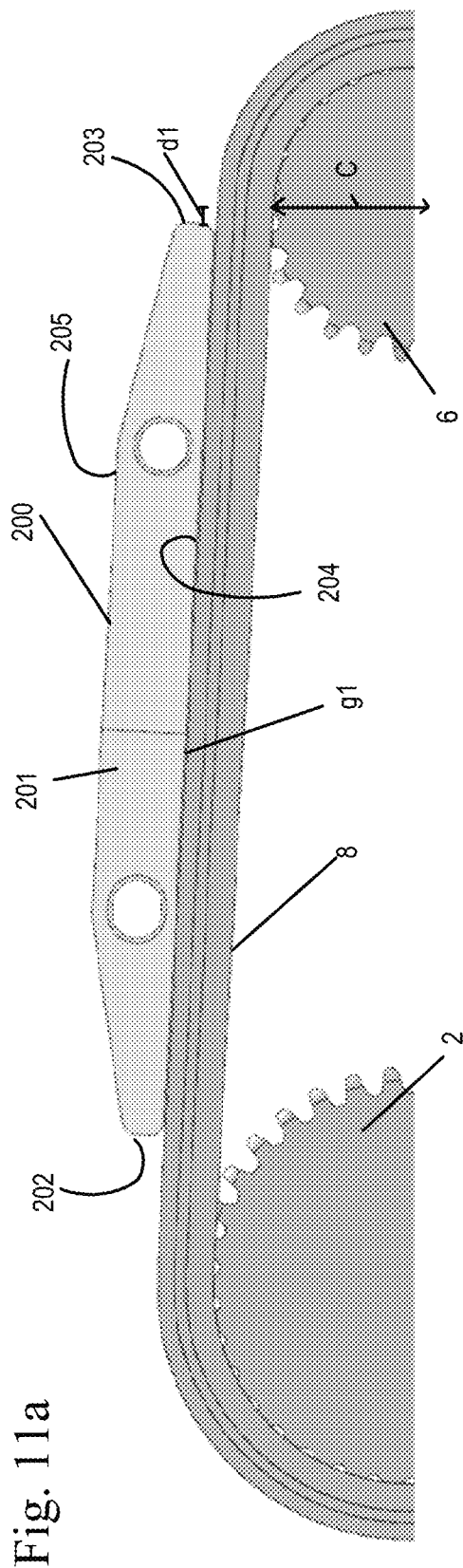
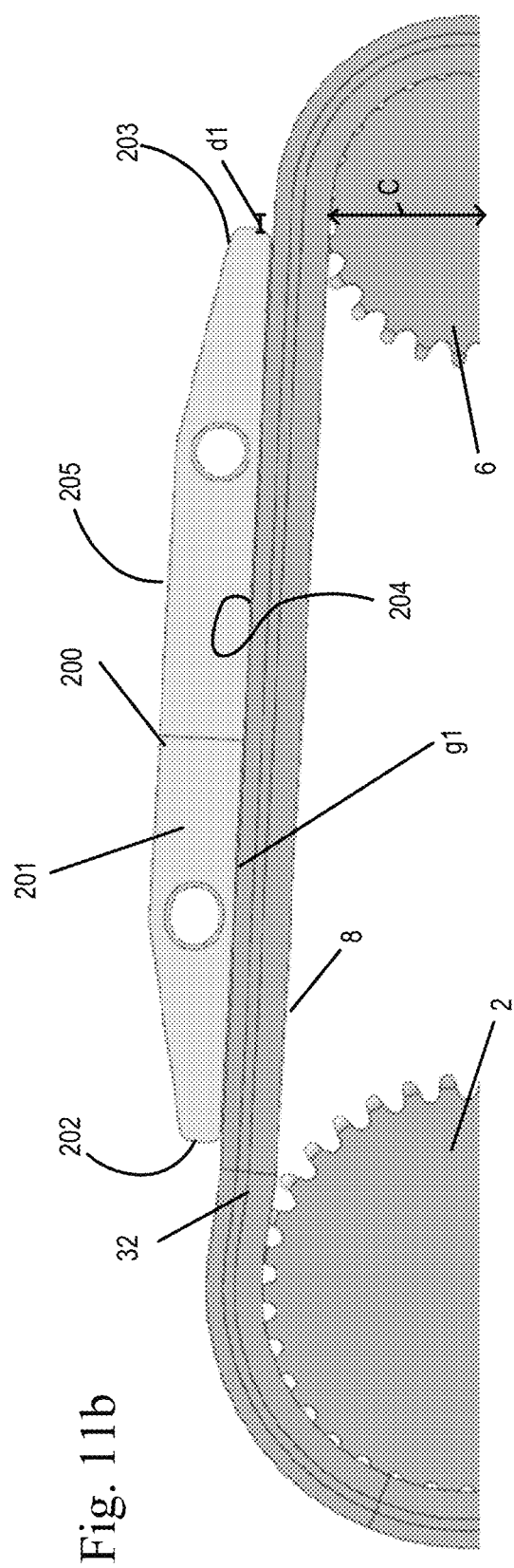
Fig. 11a
Fig. 11b

TOOTH JUMP PROTECTION DEVICE

CROSS-REFERENCE TO RELATED APPLICATIONS

This application claims priority pursuant to 35 U.S.C. 119 (e) to U.S. Provisional Patent Application Nos. 63/140,448, filed Jan. 22, 2021, and 63/218,129, filed Jul. 2, 2021, which applications are incorporated herein by reference in their entirety.

BACKGROUND

The present invention relates to chain slack buildup, and more specifically to devices which control the location of chain slack buildup.

FIGS. 1a and 1b shows an approximate location of the slack accumulation relative to a driven sprocket 6 and a drive sprocket 2 of a conventional chain system 1, respectively. The drive sprocket 2 is connected to the driven sprocket 6 via a toothed chain 8. The chain 8 meshes with the sprockets 2, 6, transmitting rotary motion between the sprockets 2, 6. A chain 8 can jump on either the driven sprocket 6 or the drive sprocket 2 of a chain system 1. Jumping of the chain 8 near the driven sprocket 6 results in a chain 8 with a lower jump torque and jumping of the chain 8 near the drive sprocket 2 results in a higher jump torque of the chain 8. Therefore, forcing jumps to only occur on the drive sprocket 2 allows a chain's jump torque performance to be higher. There are specific locations in which chain slack collects relative to the driven or drive sprocket 6, 2, determining which sprocket the chain 8 will mostly likely jump. FIG. 1a shows the slack accumulation occurring at the driven sprocket 6, indicated by reference number 30 and FIG. 1b shows the slack accumulation occurring at the drive sprocket 2, indicated by reference number 32.

SUMMARY

According to one embodiment of the present invention, a tooth jump protection device is used to control chain slack and delay the torque at which chain jump occurs, thus increasing jump torque performance.

BRIEF DESCRIPTION OF THE DRAWINGS

FIG. 8a shows a schematic of a TJPD of a ramped snubber engaged with a chain within a transfer case.

FIG. 8b shows a schematic of the TJPD of the ramped snubber when tension is applied to the opposite chain strand.

FIG. 11a shows a schematic of snubber placed at a specific distance relative to the driven sprocket and a specific gap relative to the chain.

FIG. 11b shows slack accumulation relative to the snubber of FIG. 11a.

DETAILED DESCRIPTION

In an embodiment of the present invention, a tooth jump protection device (TJPD), can be used to control chain slack within a transfer case, such that the chain slack only builds on the drive sprocket resulting in a higher jump torque. A higher jump torque capability allows for reduced chain width.

Figure 1A:
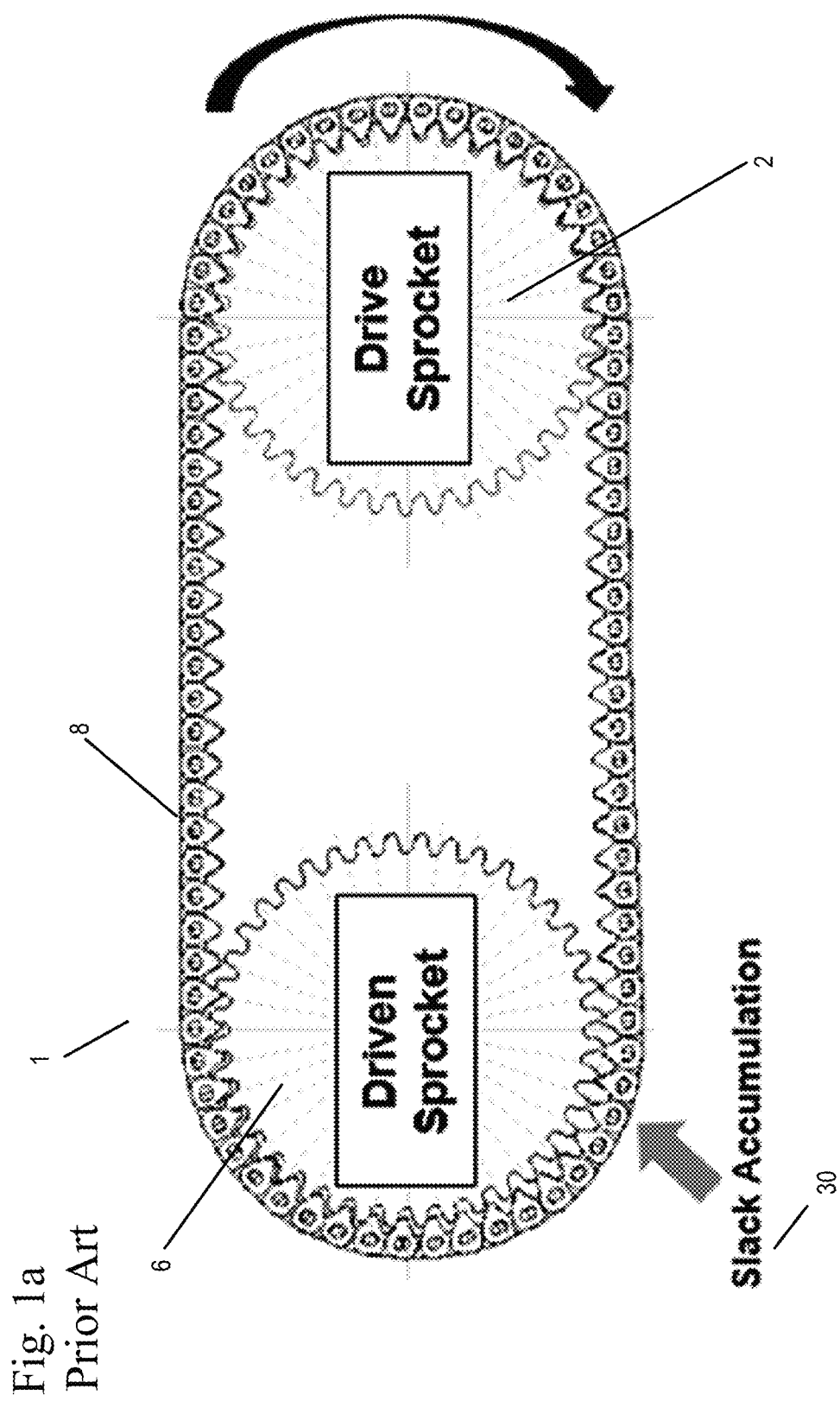
FIG. 1a shows a schematic of an approximate location of slack accumulation relative to the driven sprocket in a conventional chain system.
Figure 1B:
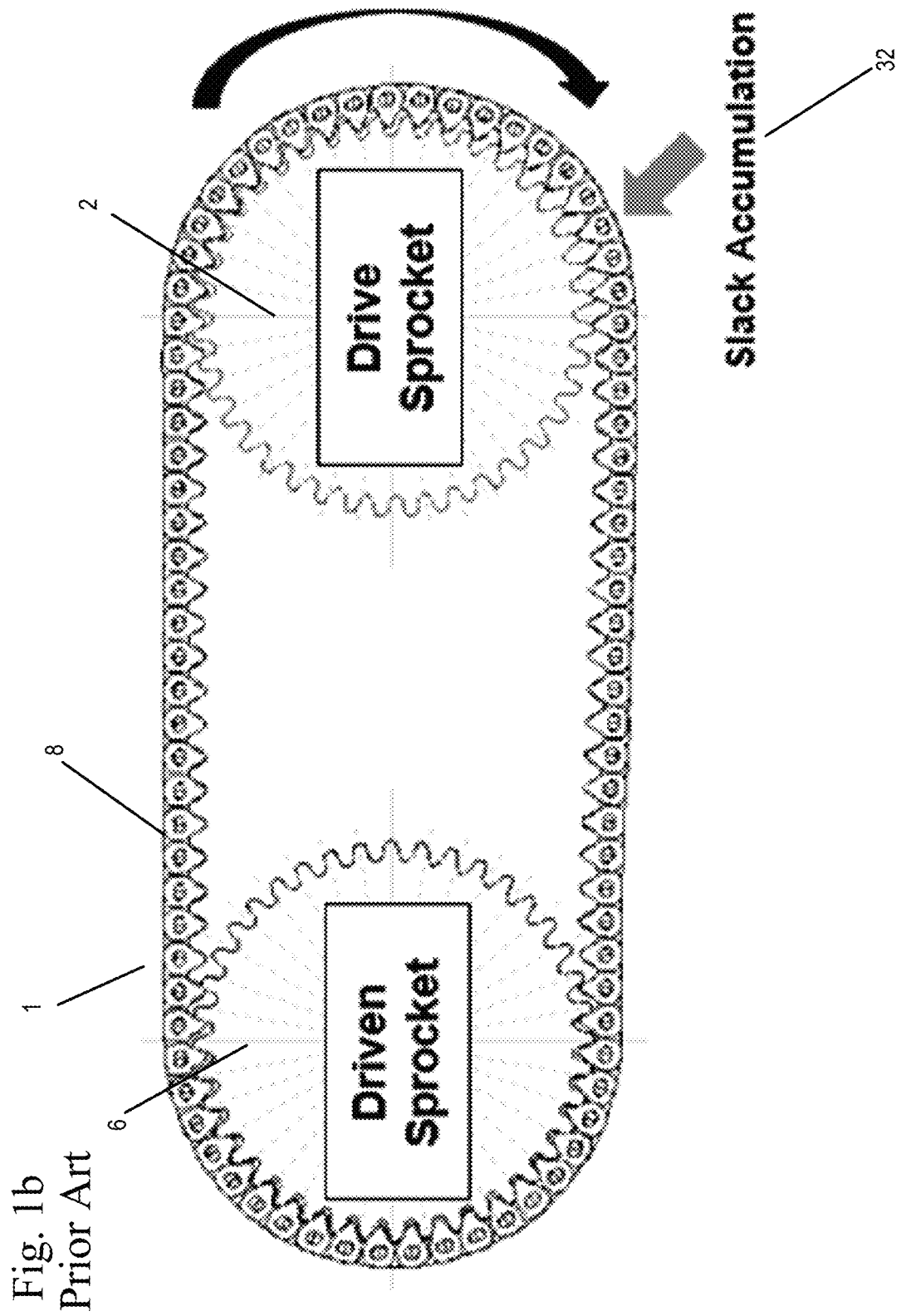
FIG. 1b shows a schematic of an approximate location of slack accumulation relative to the drive sprocket in a conventional chain system.
Figure 2:
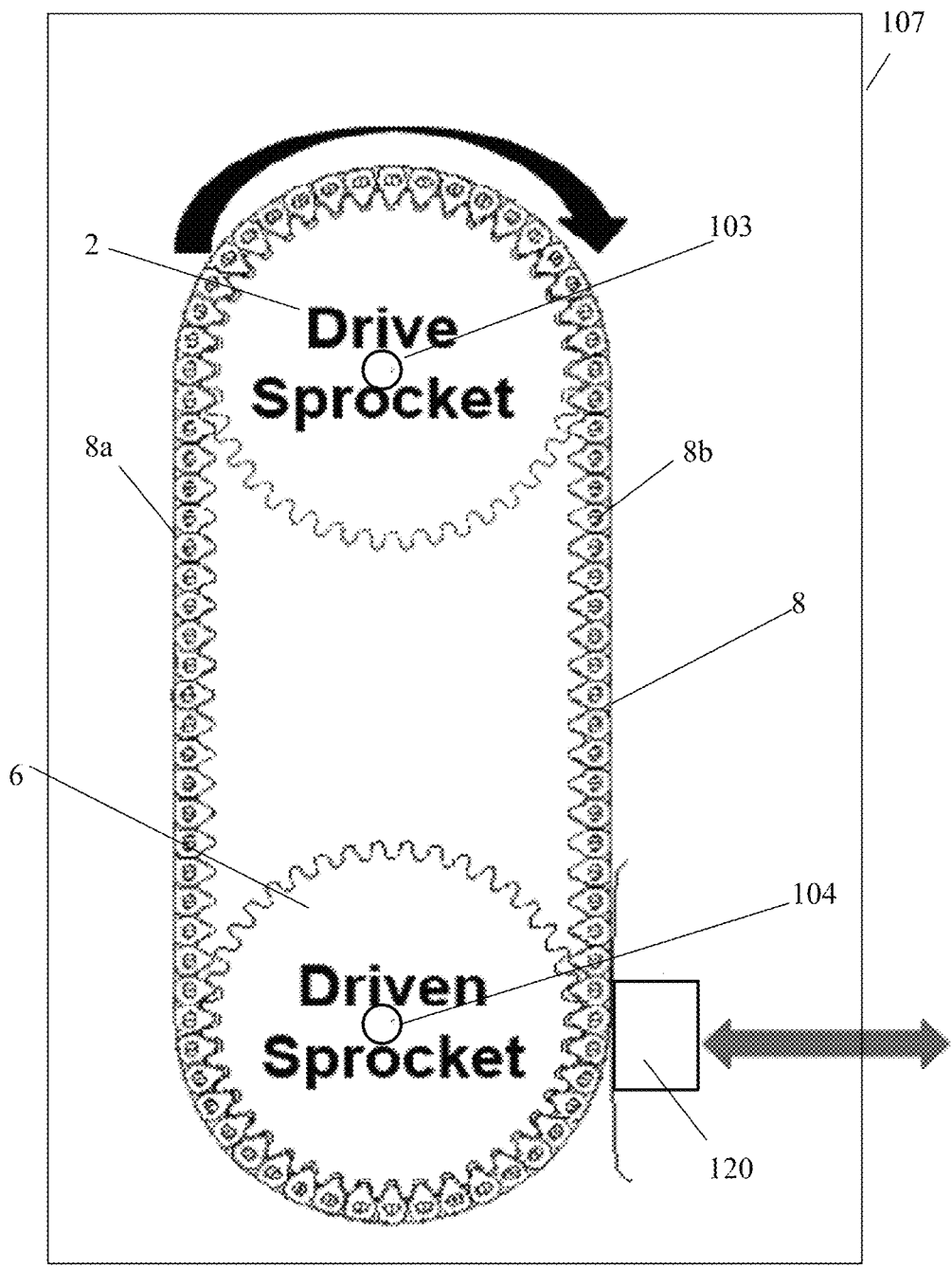
FIG. 2 shows a schematic of a vertically mounted drive system.
Figure 3:
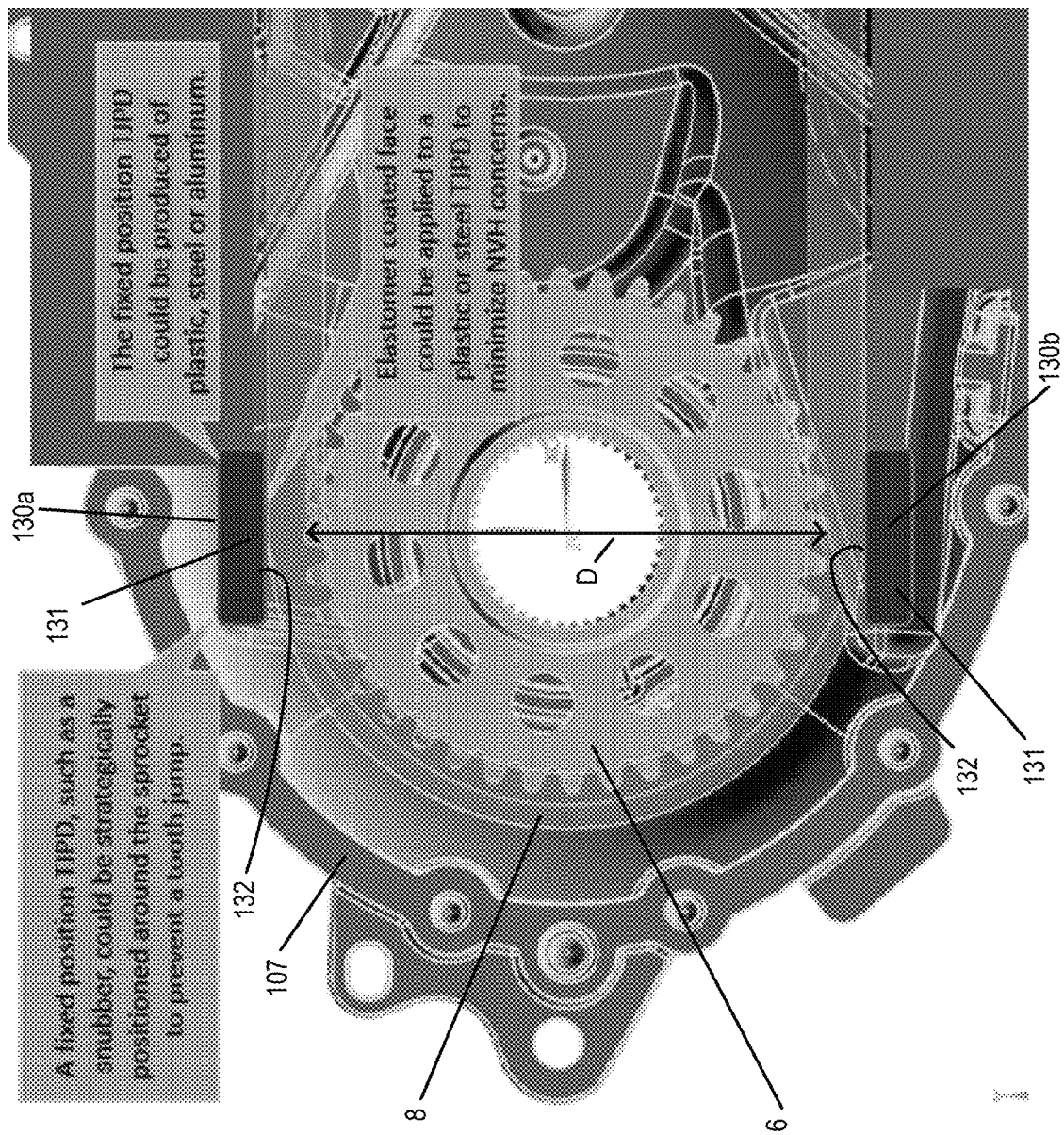
FIG. 3 shows a schematic of an embodiment of a tooth jump protection device (TJPD).

In the system layout of FIG. 2, the drive and driven shafts 103, 104 associated with the drive and driven sprockets 2, 6, respectively, are shown in a vertical orientation with the driven sprocket 6 on the bottom and the drive sprocket 2 on the top within a transfer case 107. A chain 8 connects the drive sprocket 2 to the driven sprocket 6. Between the drive sprocket 2 and the driven sprocket 6, the chain has a slack strand 8b and a tight strand 8a. As the transfer case approaches a vertical orientation, gravity encourages slack to build on the interface between the driven sprocket 6 and the chain 8 within the transfer case 107. Studies of the tooth jump and the slack of the chain in this system layout were conducted using a rigid guide or tooth jump protection device (TJPD) 120 placed at the entrance of the slack strand 8b meshing with the driven sprocket 6 at various radial offsets. Through the studies conducted, it was determined that the TJPD device 120 preferably needs to be positioned a distance radially away from the sprocket center to avoid interference with the chain's natural engagement with the sprocket. This positioning increases as the chain wears. The distance will vary depending on the system layout, chain design and point of life of the chain.

The TJPD 120 preferably provides a sufficient load to keep the chain 8 engaged on the driven sprocket 6, with the sufficient load based on stiffness requirements. The stiffness requirements of the TJPD 120 are dependent on application peak torque, radial offset of the TJPD 120, and chain type and design. As the applied torque increases, the required load from the TJPD 120 to maintain proper engagement also increases. As the chain 8 moves radially outward and deflects the TJPD 120, the required force from the TJPD 120 to maintain driven sprocket engagement increases. In terms of the chain type and design, links of the chain that have steeper flank pressure angles will require less force from the TJPD 120. It is noted that the TJPD 120 must be flexible enough to survive a catastrophic driven sprocket jump, in the event that the chain 8 was to wedge between the driven sprocket 6 and the TJPD 120.

FIG. 2 shows the transfer case in a vertical position, but the system can be orientated in any angle within the application. The TJPD 120 is located at the entrance of the driven sprocket 6. More specifically, the TJPD 120 is located at a position in which the chain 8 is tangent to the driven sprocket 6 at the first engagement of the driven sprocket 6 with the slack strand 8b of the chain 8 (e.g. the entrance of the chain 8 onto the driven sprocket 6).

In one embodiment, one-piece, fixed position TJPDs 130a, 130b are placed at the driven sprocket 6. The TJPD 130a, 130b are at the entrance and/or exit of the driven sprocket 6 regardless of the transfer case orientation angle. More specifically, TJPD 130a is located at a position in which the chain 8 is tangent to the driven sprocket 6 at the first engagement of the driven sprocket 6 with the slack strand 8b of the chain 8 (e.g. the entrance of the chain 8 onto the driven sprocket 6) and the TJPD 130b is located at a position in which the chain 8 is tangent to the driven sprocket 6 at the last engagement of the driven sprocket 6 with the tight strand 8a of the chain (e.g. the exit of the chain 8 from the driven sprocket 6).

The one-piece fixed position TJPD 130a, 130b has a body 131 which is produced from plastic, steel or aluminum and has a flat chain face 132 which interacts with the chain 8 that can include an elastomer coating. The one-piece fixed position TJPDs 130a, 130b can be a snubber which is bolted to the transfer case 107 relative to the chain 8 and the driven sprocket 6. The thickness of the elastomer coating can vary based on the chain and design layout. Furthermore, the body 131 and/or the thickness of the elastomer coating of the TJPDs 130a, 130b on opposite sides of the driven sprocket 6 can be the same or different.

Figure 4:
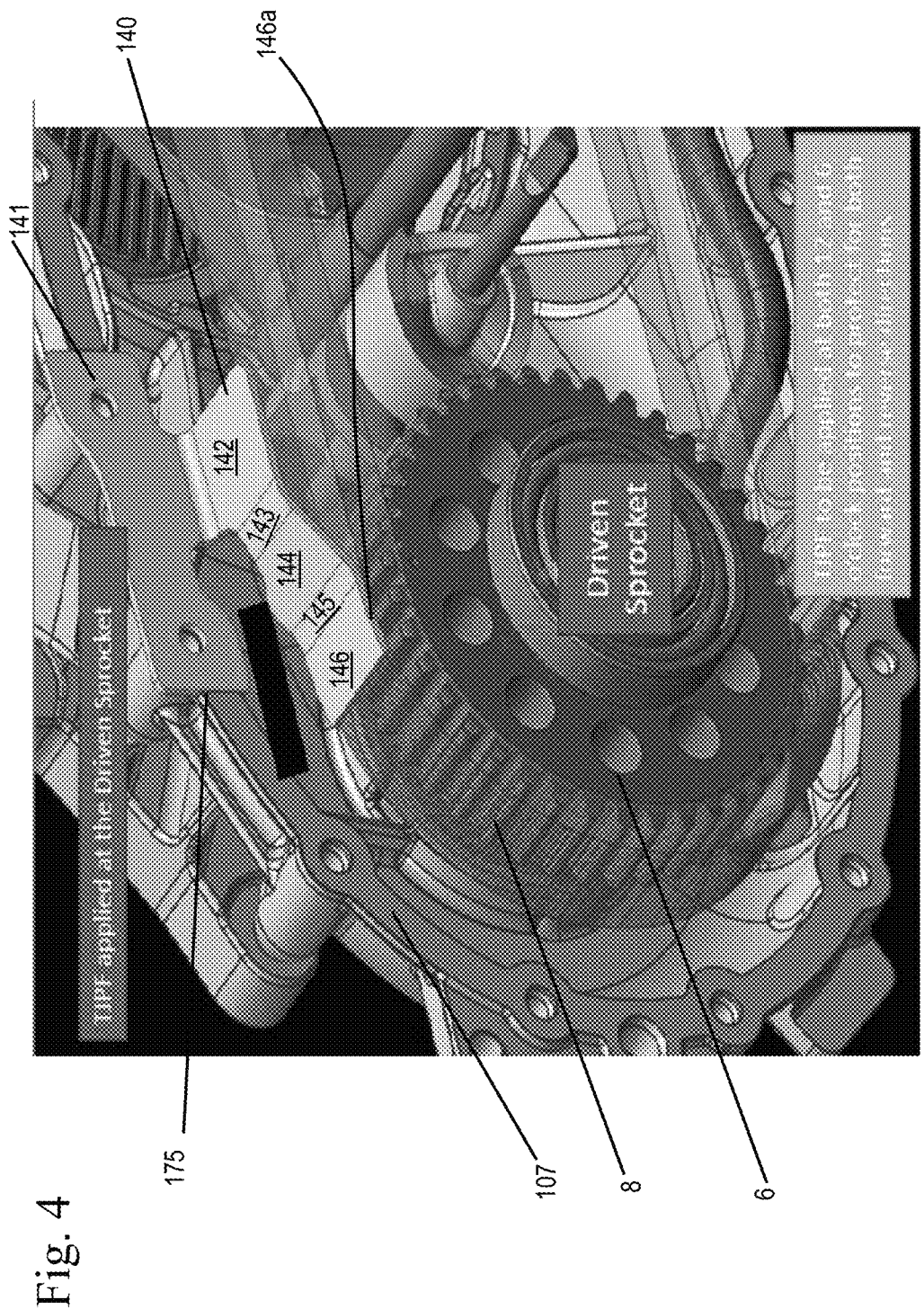
FIG. 4 shows a schematic of another embodiment of a TJPD.
Figure 5:
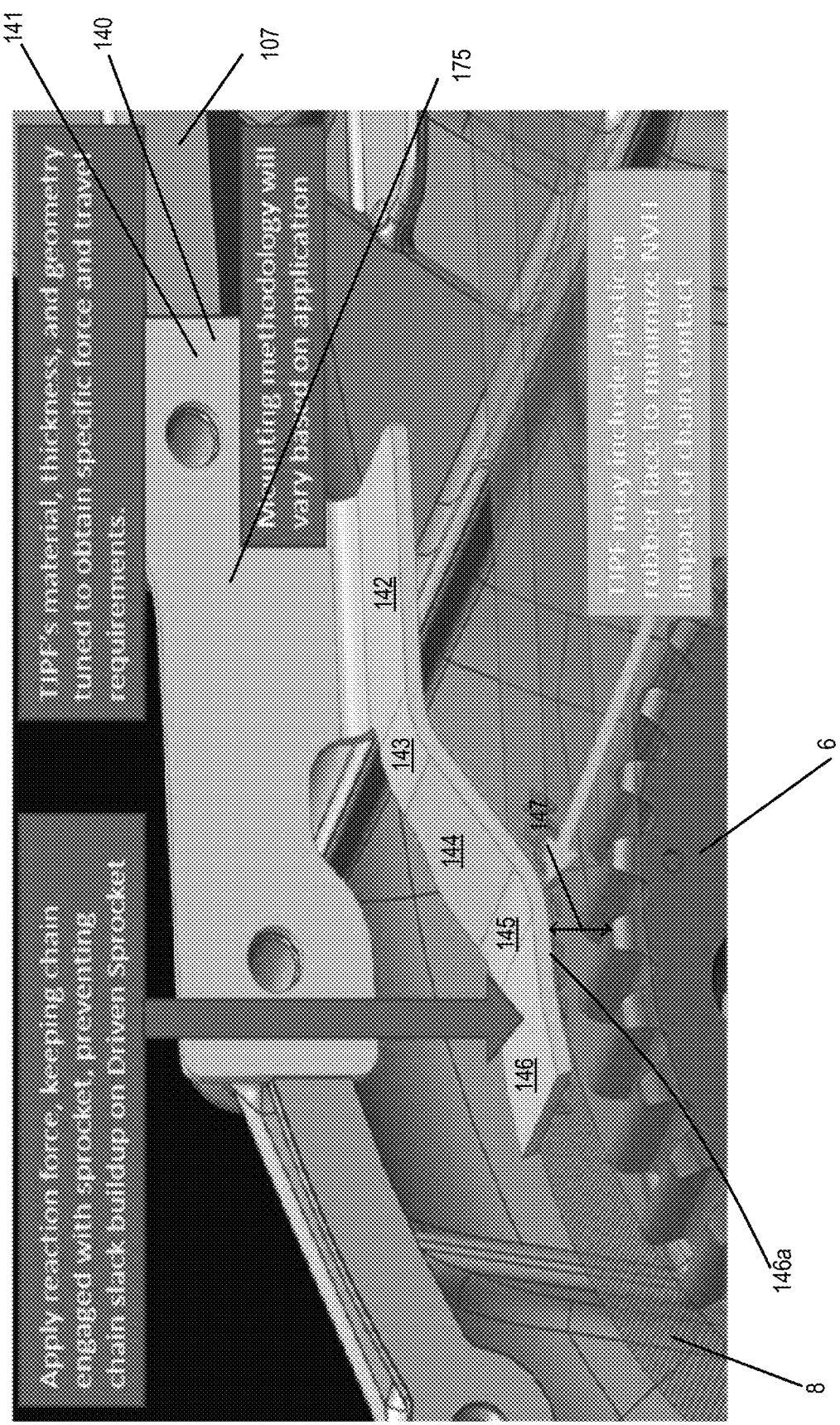
FIG. 5 shows a detailed view of the TJPD of FIG. 4.

FIGS. 4-5 show another embodiment of a TJPD 175 mounted to the transfer case 107 and adjacent the chain 8 and the driven sprocket 6. In this embodiment, the TJPD 175 is a an "L-shaped" one-piece multi-faceted ramp 140 with a mounting bracket 141. The mounting bracket 141 may be integrally formed with the multi-faceted ramp 140. In one embodiment, the mounting bracket 141 and the one-piece multi-faceted ramp 140 are formed from a single sheet of steel. The mounting bracket 141 is at approximately a 90 degree angle relative to a first flat face 142 of the multi-faceted ramp 140. In other words, the mounting bracket is the vertical portion of an "L" and the multi-faceted ramp 140 is the horizontal portion of the "L". The multi-faceted ramp 140 is preferably flexible and has a smooth contour.

The multi-faceted ramp 140 is comprised of a first flat surface 142 at approximately 90 degrees to the mounting bracket 141, a first transition ramp 143, an angled ramp 144, a second transition ramp 145 and a second flat surface 146. The second flat surface 146 has a face 146a which is offset from the chain 8 by a small gap 147 when installed. As the chain 8 wears or elongates, the gap 147 decreases and contact between the chain 8 and the face 146a is possible during normal operation of the chain 8. As the chain 8 rotates, and a tooth jump occurs, the face 146a of the second flat surface 146. TJPD 175 applies a reaction force on the chain 8 to keep the chain 8 engaged with the driven sprocket 6 and to prevent chain slack buildup on the driven sprocket 6.

Alternatively, the multifaceted ramp 140 can include offset flat planes with a cantilever between the offset flat planes. More specifically, the multifaceted ramp 140 can include a first flat face 142, a second flat face 146 and an angled ramp 144, without transition ramps 143, 145. The angled ramp 144 is preferably flexible and has a smooth contour.

The face 146a can contain plastic or an elastomer face to minimize noise, vibration, and harshness (NVH) concerns and improve wear resistance of the TJPD 175. The TJPD 175 is preferably mounted such that the face 146a of the second flat surface 146 is placed at the driven sprocket 6 and/or the drive sprocket 2 along a diameter and located at the entrance and/or exit of the driven sprocket 6 or the driving sprocket 2 regardless of orientation angle of the transfer case. More specifically, at least a first TJPD 175 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 175 can be located at a position in which the chain 8 is tangent to the driven sprocket 6 at the last engagement of the driven sprocket 6 with the tight strand 8a of the chain (e.g. the exit of the chain 8 from the driven sprocket 6).

Figure 10:
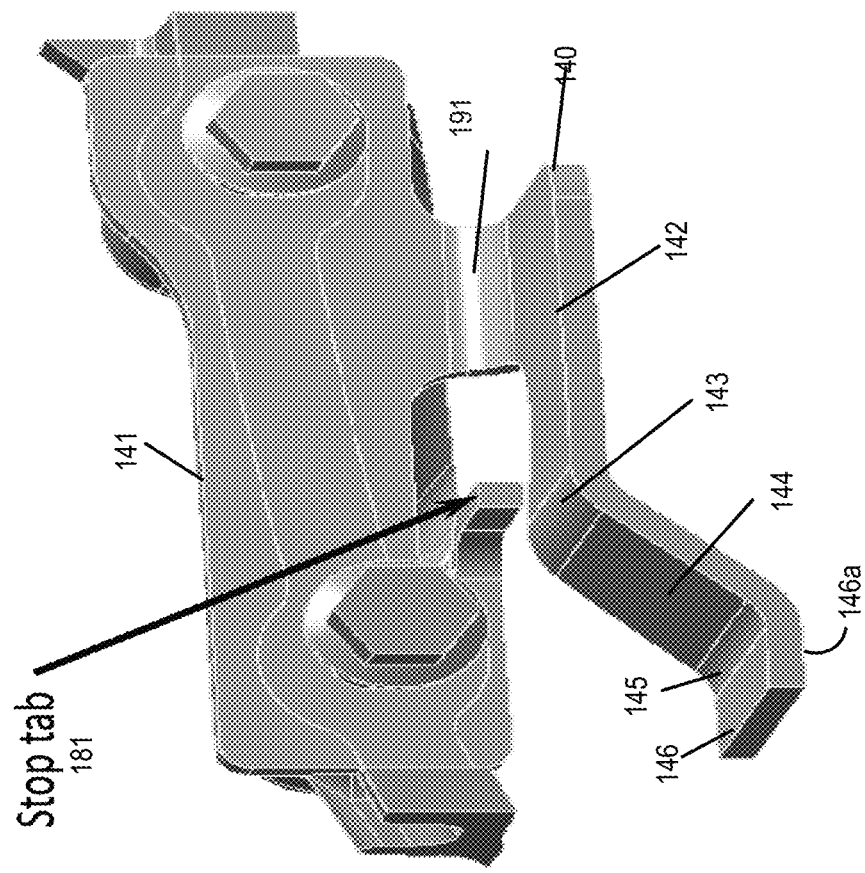
FIG. 10 shows another embodiment of a TJPD.

Alternatively, the TJPD 175 can include a stop 181 as shown in FIG. 10. In this embodiment, a stop 181 is mounted to the mounting bracket 141. The stop 181 is preferably placed adjacent the first transition ramp 143 of the multi-faceted ramp 140. The stop 181 may be a tab or other such protrusion. The stop 181 may be integrally formed with the mounting bracket 141.

The addition of the stop 181 reduces bending of the entire multi-faceted ramp 140 at the point of connection 191 between the multi-faced ramp 140 and the bracket 141. Additionally, the stop 181 reduces bending at the first transition ramp 143 so that stress on the multi-faceted ramp 140 is more evenly distributed.

Figure 6:
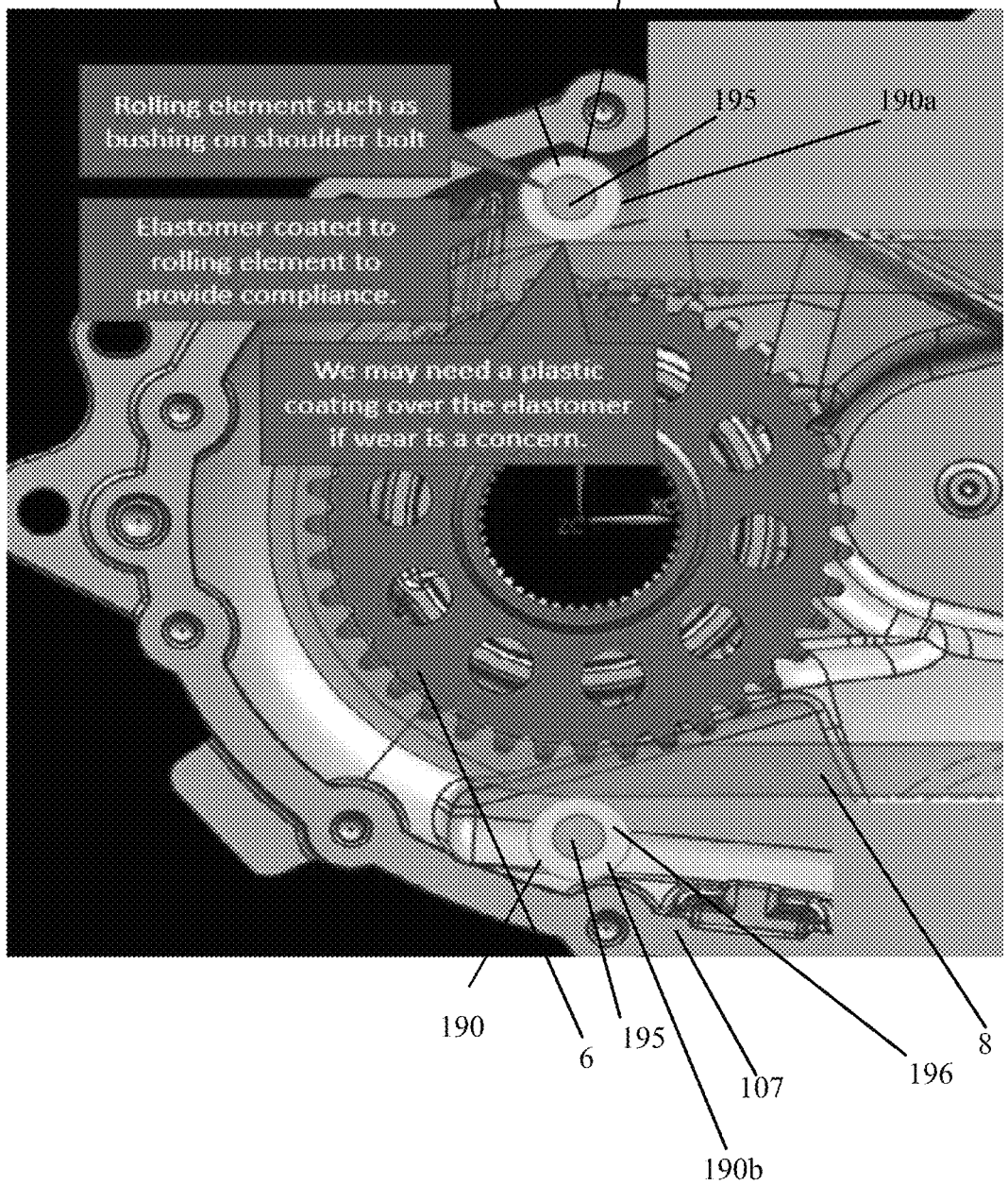
FIG. 6 shows a sectional view of a TJPD as a fixed position compliant roller within a transfer case.

FIG. 6 shows an embodiment in which the TJPD 190a, 190b is a fixed position roller. Each TJPD 190a, 190b includes a bolt 195 fixedly mounted to the transfer case 107. Surrounding and freely spinning on the bolt 195 is a rolling element 196. The rolling element 196 preferably has an elastomer coating.

The TJPDs 190a, 190b are placed at the driven sprocket 6. The TJPD 190a, 190b are at the entrance and/or exit of the driven sprocket regardless of the transfer case orientation angle. More specifically, TJPD 190a is located at a position in which the chain 8 is tangent to the driven sprocket 6 at the first engagement of the driven sprocket 6 with the slack strand 8b of the chain 8 (e.g. the entrance of the chain 8 onto the driven sprocket 6) and the TJPD 190b is located at a position in which the chain 8 is tangent to the driven sprocket 6 at the last engagement of the driven sprocket 6 with the tight strand 8a of the chain (e.g. the exit of the chain 8 from the driven sprocket 6).

Figure 7:
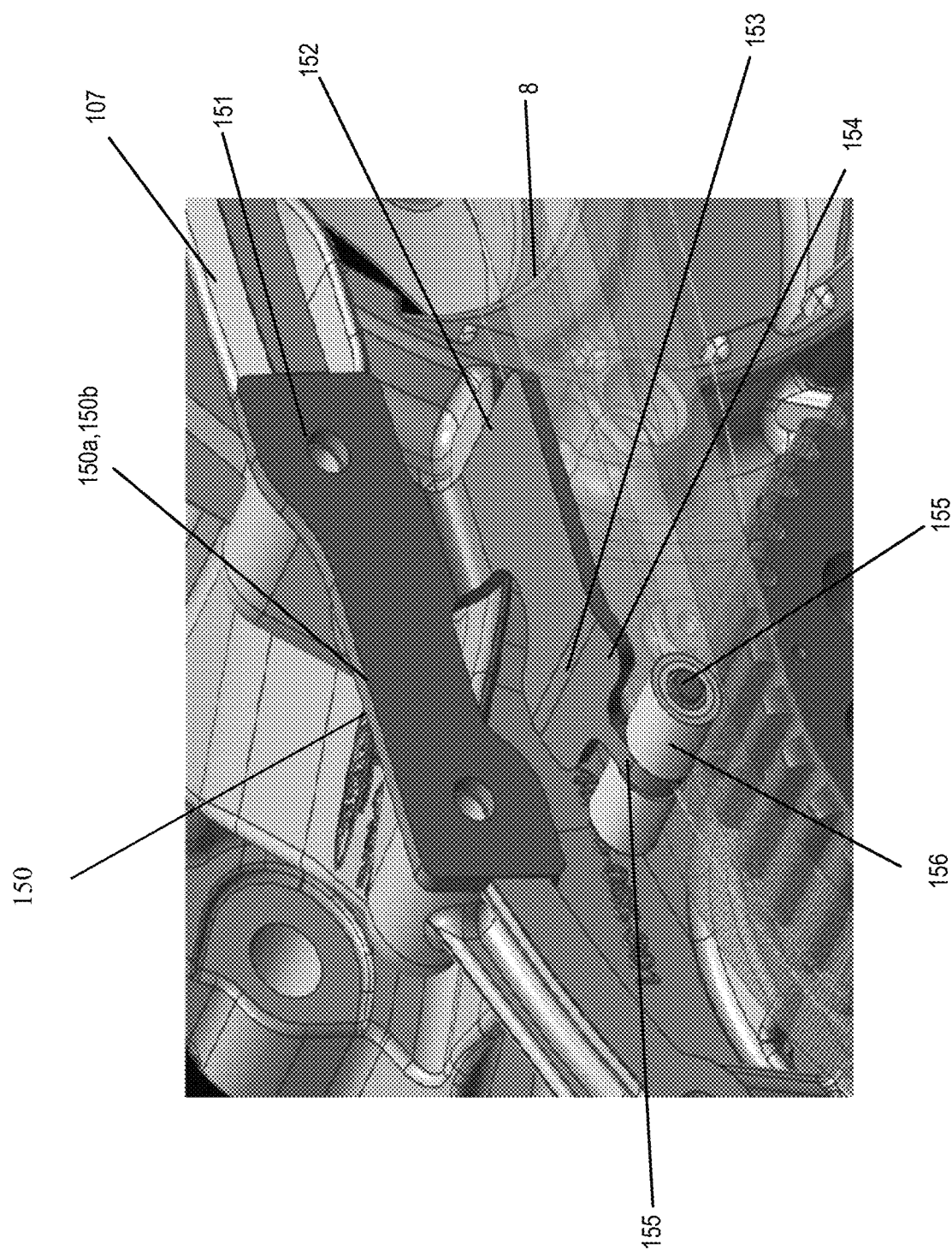
FIG. 7 shows a detailed view of a TJPD with a compliant roller.

FIG. 7 shows an embodiment in which the TJPD 180 is a ramped roller TJPD. The TJPD 180 is mounted within a transfer case 107 and adjacent the chain 8 and the driven sprocket 6.

The mounting brackets 151 are at approximately a 90 degree angle relative to a first flat face 152 which transitions to a first transition ramp 153, an angled ramp 154 and to a compliant roller holder 155 which receives a compliant roller 156. In other words, the mounting bracket is the vertical portion of an "L" and the first transition ramp 153 is the horizontal portion of the "L". The angle of the mounting of the bracket 151 relative to the compliant roller 156 may be any angle which both mounts the TJPD 150a, 150b to the transfer case 107 and allows the compliant roller 156 to engage with the chain 8.

The TJPD 180 is preferably mounted such that the face compliant rollers 156 are placed at the driven sprocket 6 and/or the drive sprocket 2 along a diameter and located at the entrance and/or exit of the driven sprocket 6 or the driving sprocket 2 regardless of orientation angle of the transfer case. More specifically, at least a first TJPD 180 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 180 can be located at a position in which the chain 8 is tangent to the driven sprocket 6 at the last engagement of the driven sprocket 6 with the tight strand 8*a* of the chain (e.g. the exit of the chain 8 from the driven sprocket 6).

The face compliant roller 156 may be made of plastic. Alternatively, the face compliant roller 156 may be made of plastic or other material and coated with an elastomer to reduce wear. The face compliant roller 156 can be a single roller mounted to the compliant roller holder 155 or multiple different rollers mounted on either side of the compliant roller holder 155 as shown in FIGS. 7 and 13.

Figure 13:
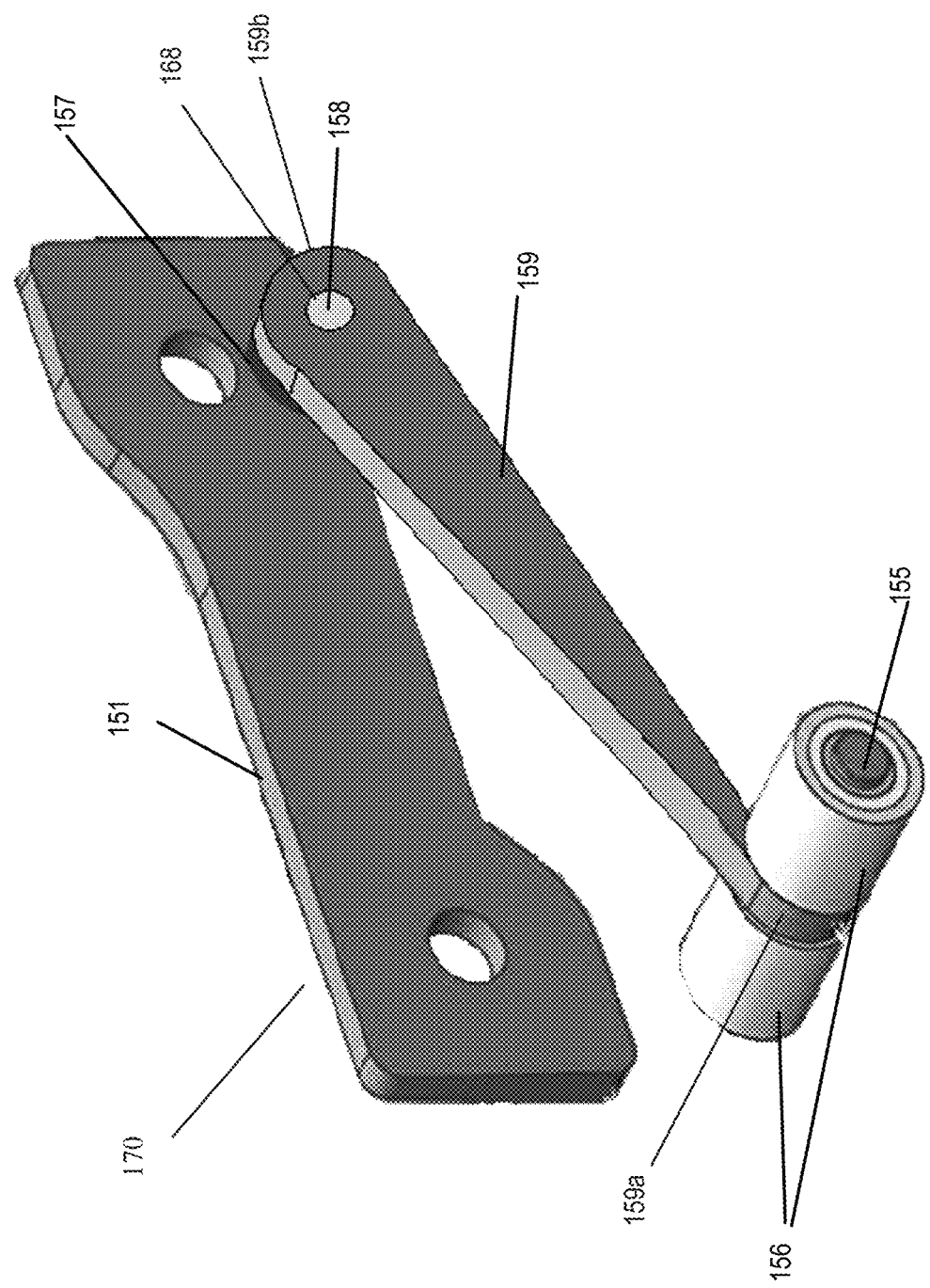
FIG. 13 shows a schematic of a TJPD of a compliant roller which is spring biased toward engagement with a chain.

In an alternate embodiment, shown in FIG. 13, the TJPD 170 with face compliant roller 156 is spring 157 biased towards engagement with the chain 8 to further focus the accumulation of system slack at specific locations of the drive or driven sprocket 2, 6 to lower contact forces. The face compliant roller 156 is received on a compliant roller holder 155 which is integral with an arm 159. The face compliant roller 156 has a reduced amount of friction relative to the chain 8 in comparison to the chain sliding across a conventional tensioner arm.

The arm 159 is pivotably attached to the mounting bracket 151 via pivot pin 158 received within a pivot hole 168 of the arm 159 at a second end 159*b* of the arm 159 opposite of the compliant roller holder 155 at the first end 159*a*. The pivot pin 158 is mounted to the mounting bracket at a 90 degree angle. The arm 159 is preferably rigid.

A spring 157 is present between the first end 159*a* of the arm 159 and the bracket 151 to bias the arm 159 and thus the face compliant roller 156. The spring forces for each sprocket 2, 6 or the entrance and exit of the chain 8 from either of the driven sprocket 6 or the drive sprocket 2 may be different or the same. The spring 157 may be a torsional spring, a blade spring or other type of spring. The use of the spring 157 increases the compliance allowing for reduced contact forces. Furthermore, the spring 157 used can have a limited stroke range, such that in a first position, the spring 157 biases the face compliant roller 156 such that the face compliant roller 156 does not engage with the chain 8 and a clearance is present between the face compliant roller 156 and the chain 8. When the chain 8 contacts the face compliant roller 156 with enough force to overcome the preload of the spring, the face compliant roller 156 moves to a second position by rotating the arm 159 connected to compliant roller holder 155, such that the arm 159 pivots via pivot pin 158 relative to the mounting bracket 151. The spring preload is used to prevent tooth jump of the chain. The spring load is preferably tuned to the required force to prevent tooth jump and therefore reduce or prevent chain slack from building at the driven sprocket 6.

The TJPD 170 is preferably mounted such that the face compliant roller 156 is placed at the driven sprocket 6 and/or the drive sprocket 2 along a diameter and located at the entrance and/or exit of the driven sprocket 6 or the driving sprocket 2 regardless of orientation angle of the transfer case. More specifically, at least a first TJPD 170 is located at a position in which the chain 8 is tangent to the driven sprocket 6 at the first engagement of the driven sprocket 6 with the slack strand 8*b* of the chain 8 (e.g. the entrance of the chain 8 onto the driven sprocket 6). A second TJPD 170 can be located at a position in which the chain 8 is tangent to the driven sprocket 6 at the last engagement of the driven sprocket 6 with the tight strand 8*a* of the chain (e.g. the exit of the chain 8 from the driven sprocket 6).

FIGS. 8*a*-8*b* shows another embodiment of TJPD. In this embodiment, the TJPD is a biased snubber 160. The biased snubber 160 is mounted to the drivetrain transfer case 107. The biased snubber 160 has a body 161 with a first end 162, a second end 163 opposite the first end 162 with a length L between the first end 162 and the second end 163, a snubber face 164, and a second face 165, opposite the snubber face 164. Along the snubber face 164 an intended angle α (alpha) is present between the first end 162 and the second end 163 relative to a straight line 193 extending from the first end 162 to the second end 163 and parallel to the snubber face 164. The intended angle α is between 0-5 degrees and more preferably, greater than 0 degrees.

The biased snubber 160 creates an intended angle α between the path of the chain 8 and snubber face 164, such that an intended angle α is present between the chain path and the snubber face 164. The snubber face 164 is shaped such that the snubber face 164 is closer to the chain 8 near the driven sprocket 6 as compared to the driving sprocket 2. The intended a angle forces the chain slack to accumulate near the chain exit of the driving sprocket 2 as indicated by reference number 32. The biased snubber 160 is fully outside of the chain path when the tension is applied to the adjacent chain strand as shown in FIG. 8*a*.

When tension is applied to the opposite chain strand, slack will accumulate on the chain strand adjacent to the biased snubber 160 and the intended angle α (alpha) of the biased snubber 160 forces the excess chain to accumulate in a known location that improves tooth jump as shown in FIG. 8*b*. Therefore, slack accumulation is present only near the drive sprocket 2 and can be used to control chain slack within a transfer case, such that the chain slack only builds on the drive sprocket 2 resulting in a higher jump torque. A higher jump torque capability allows for reduced chain width.

It is noted that the biased snubber 160 can also be mounted a targeted distance relative to the driven sprocket and within a targeted or specific chain-to-snubber gap to prevent slack accumulation relative to the driven sprocket 6 and force slack accumulation near the drive sprocket 2 as described below relative to FIGS. 11*a*-11*b*.

FIGS. 11*a*-11*b* show an embodiment of a TJPD of a snubber 200 that is placed at a specific or targeted distance relative to the driven sprocket 6 and within a targeted or specific chain-to-snubber gap to prevent slack accumulation relative to the driven sprocket 6 and force slack accumulation near the drive sprocket 2. The snubber 200 has a body 201 with a first end 202 and a second end 203 and a first face 205 and a second face 204. The second face 204 is adjacent the chain 8. Optionally, the second face 204 can include a pad or elastomeric surface to reduce noise vibration harshness (NVH) concerns. The snubber's location is positioned a gap distance g1 away from the chain and biased a distance d1 away from the driven sprocket 6. These distances g1, d1 are determined by the mounting location of the chain 8 and the sprockets 2, 6 relative to the transfer case 107.

The snubber 200 is placed between the driven sprocket 6 and the drive sprocket 2 at a specific distance d1 from a centerline C of the driven sprocket 6 and also at a specific gap distance g1 between the second face 204 and the chain 8. In one example, the gap distance g1 between the chain 8 and the snubber 200 is in a range between 0-7 mm. In another embodiment, the range can be 0-1 mm. In another embodiment, the range can be 0-2 mm. In yet another example, the gap distance g1 is 0.5 mm or less. By setting a gap distance between the chain 8 and the snubber 200, the contact forces and wear of the snubber 200 decreases. Using chain pitch lengths, the distance d1 could be approximately two chain pitch lengths. For example, a 9.525 mm pitch chain, d1 would be approximately 19 mm. For a 11.039 mm pitch chain, the distance d1 would be approximately 22 mm.

When tension is applied to the opposite chain strand from which the snubber 200 is adjacent, slack will accumulate on the chain strand adjacent to the snubber 200 due to the gap distance g1 and the distance d1 forcing the excess chain to accumulate in a known location near the drive sprocket 2 resulting in a higher jump torque. The higher jump torque capability allows for reduced chain width to be used.

Figure 9:
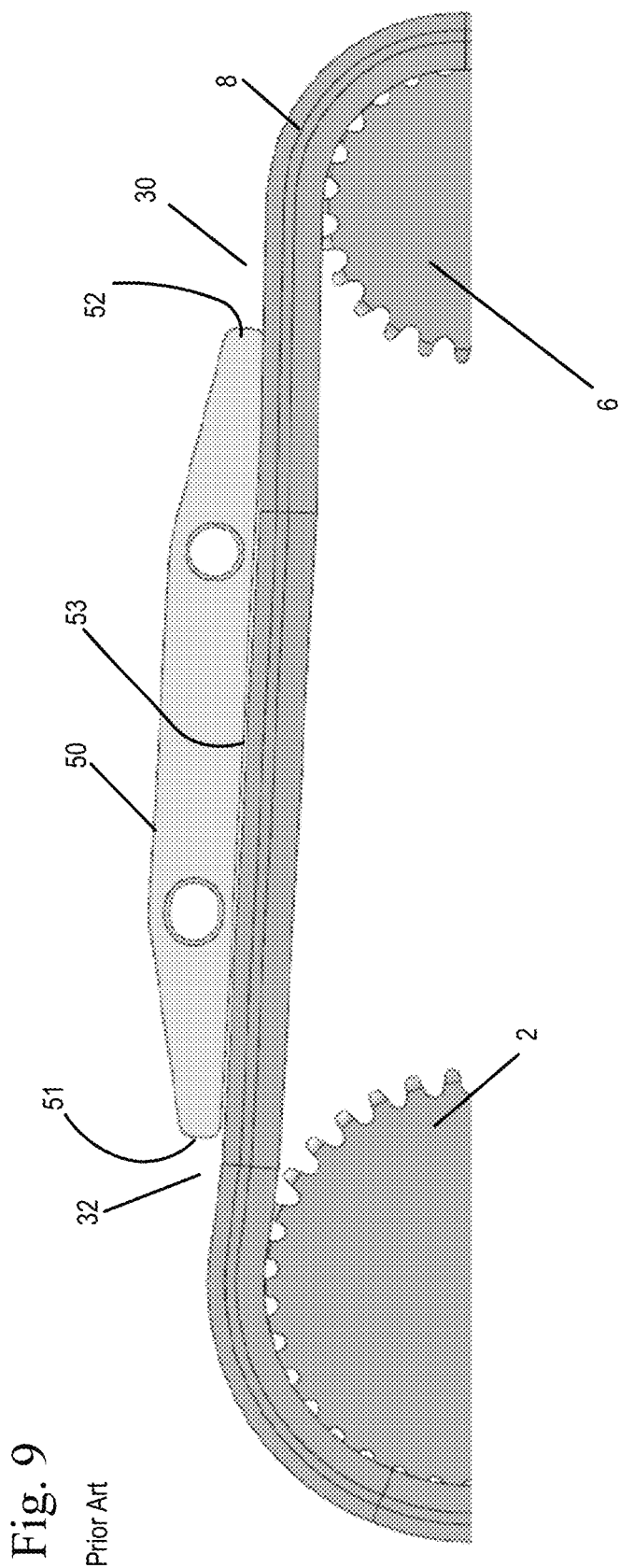
FIG. 9 shows a prior art snubber engaged with a chain.

FIG. 9 shows a conventional or traditional snubber. The traditional snubber 50 does not have an angle and instead is straight or approximately 180 degrees between the first end 51 and the second end 52 across the length, such that the entire snubber face 53 interacts with the chain strand 8 and a minor gap of approximately 0.1 mm is present between the traditional snubber 50 and the chain. Slack accumulates near the drive sprocket 2 at the position indicated by reference number 32 as well as near the driven sprocket 6 indicated by reference number 30. Therefore, slack is permitted to accumulate near both the drive sprocket 2 and the driven sprocket 6, and tooth jump may occur on either sprocket.

Figure 12:
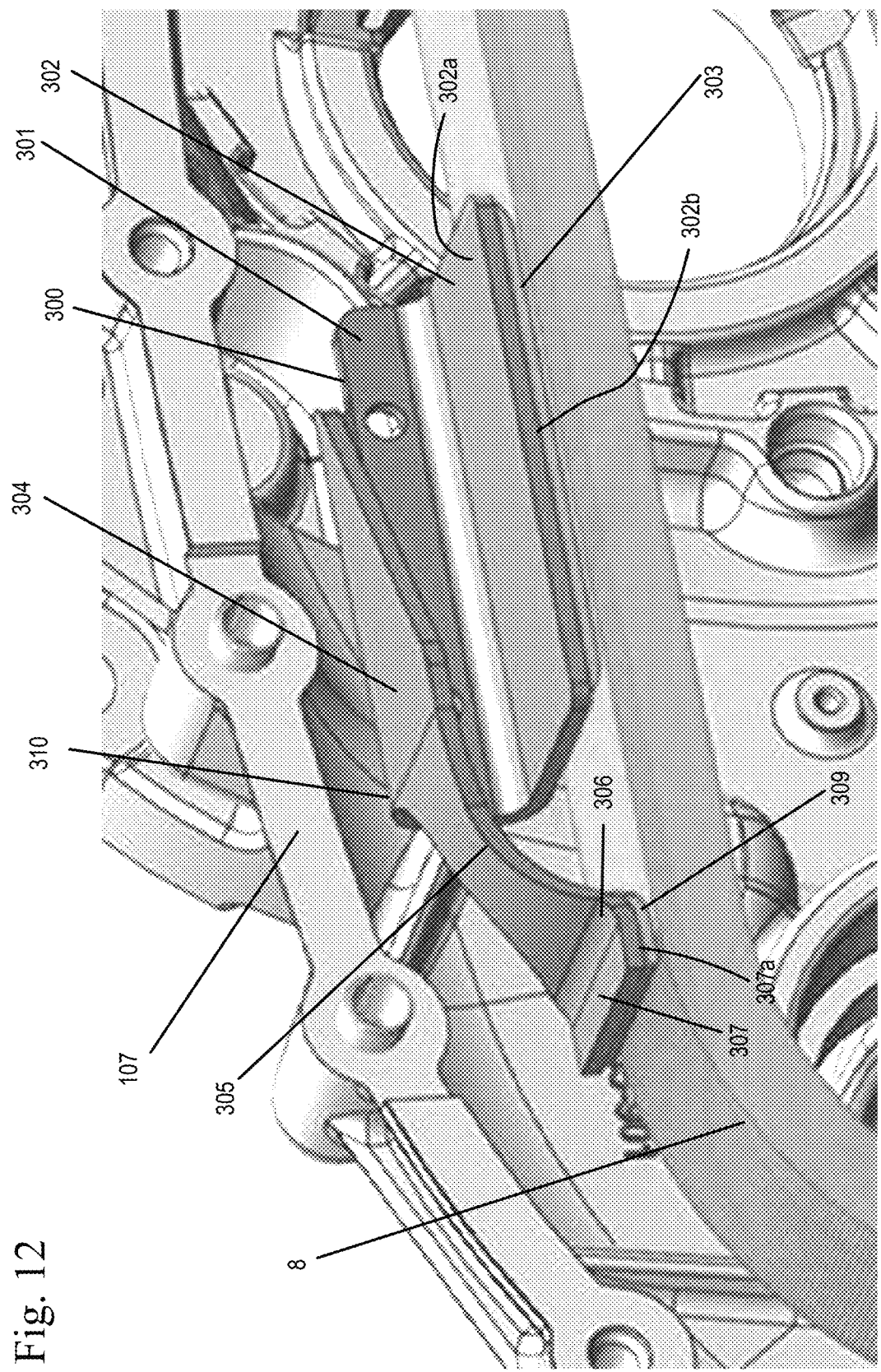
FIG. 12 shows a view of a TJPD with a snubber mounted within a transfer case.

FIG. 12 shows a TJPD 300 mounted to the transfer case 107 and situated adjacent the chain 8 and the driven sprocket 6. In this embodiment, the TJPD 300 is a one-piece multi-faceted ramp 310 with a mounting bracket 301 and snubber 302.

The mounting bracket 301 may be integrally formed with the multi-faceted ramp 310. Additionally, the mounting bracket 301 may be integrally formed with snubber 302.

The snubber 302 has a first flat face 302a and a second, opposite flat face 302b adjacent the chain 8. Attached to the second flat face 302b is a pad or elastomer pad 303. The pad 303 contacts the chain 8.

Also attached to the mounting bracket 301 is a multi-faceted ramp 310. The multi-faceted ramp 310 has a first body portion 304 with a flat face connected to the mounting bracket 301 and a ramped second body portion 305. The ramped second body portion 305 is connected to a first transition ramp 306, which is connected to a first flat surface 307. Attached to a face 307a of the first flat surface 307 is a pad or elastomer face 309.

The pad 309 is offset from the chain 8 by a small gap when installed. For example, the gap between the pad 309 and the chain 8 is between 0.5-1.5 mm. As the chain 8 wears or elongates, the gap decreases and contact between the chain 8 and the pad 309 is possible during normal operation of the chain 8. As the chain 8 rotates, and a tooth jump occurs, the pad 309 of the TJPD 300 applies a reaction force on the chain 8 to keep the chain 8 engaged with the driven sprocket 6 and to prevent chain slack buildup on the driven sprocket 6. The pad 303 maintains contact with the chain 8 during normal operation of the chain. The pad 303 acts like a snubber to attenuate chain resonance and contacts the chain when the chain enters a resonance condition.

The TJPD 300 is preferably mounted such that the pad 309 of the multi-faceted ramp 310 is placed at the driven sprocket 6 or the drive sprocket 2 along a diameter of the driven sprocket 6 or the drive sprocket 2 and located at the entrance and/or exit of the driven sprocket regardless of the transfer case orientation angle.

More specifically, at least a first TJPD 300 is located at a position in which the chain 8 is tangent to the driven sprocket 6 at the first engagement of the driven sprocket 6 with the slack strand 8b of the chain 8 (e.g. the entrance of the chain 8 onto the driven sprocket 6). A second TJPD 300 can be located at a position in which the chain 8 is tangent to the driven sprocket 6 at the last engagement of the driven sprocket 6 with the tight strand 8a of the chain (e.g. the exit of the chain 8 from the driven sprocket 6).

In one embodiment, the mounting bracket 301 and the snubber 302 are formed from a single sheet of steel. The mounting bracket 301 is at approximately a 90 degree angle relative to a first flat face 302a of the snubber 302.

The snubber 302 of the TJPD 300 provides an additional reduction of noise vibration and harshness (NVH) to reduce by controlling strand resonance associated with the chain system, while the multi-faceted ramp 310 of the TJPD 300 limits slack accumulation on the driven sprocket 6.

While two TJPD 130, 150, 160, 170, 175 180, 190 200, 300 are shown on either side of the driven sprocket 6, a single TJPD may be placed a specific or targeted distance relative to the driven sprocket 6.

In another embodiment, either a single TJPD or two TJPD can be shown on either side of a driving sprocket 2 to force slack accumulation to occur on the driven sprocket 6.

While not shown, in an alternate embodiment, the two TJPD devices mounted along a diameter of the driven sprocket and/or driving sprocket can be different devices. Any combination of TJPDs disclosed within the application can be present on the entrance and exit of the chain from the driven sprocket 6. Therefore, the first TJPD at the first engagement of the driven sprocket 6 with the slack strand 8b of the chain 8 (e.g. the entrance of the chain 8 onto the driven sprocket 6) can be the same or different than a second TJPD located at a position in which the chain 8 is tangent to the driven sprocket 6 at the last engagement of the driven sprocket 6 with the tight strand 8a of the chain (e.g. the exit of the chain 8 from the driven sprocket 6).

For example, one piece fixed position TJPD 130 may be mounted at the first engagement of the driven sprocket 6 with the slack strand 8b of the chain 8 (e.g. the entrance of the chain 8 onto the driven sprocket 6) and a second TJPD may be a L-shaped one piece multi-faceted ramp TJPD 140 mounted at the last engagement of the driven sprocket 6 with the tight strand 8a of the chain. In another example, the fixed position compliant roller TJPD 150 can be mounted at the first engagement of the driven sprocket 6 with the slack strand 8b of the chain 8 (e.g. the entrance of the chain 8 onto the driven sprocket 6) and a second TJPD may be a snubber TJPD 300, mounted at the last engagement of the driven sprocket 6 with the tight strand 8a of the chain. The examples above are not limiting, and other combinations are possible.

Furthermore, along the chain spans between the driven and driving sprockets, the TJPDs which are mounted on opposite chain strands can also differ. For example, one the TJPD can be a biased snubber TJPD 160 and the opposite TJPD mounted relative to the opposite chain strand is snubber TJPD 200. The examples above are not limiting, and other combinations are possible.

In yet another embodiment, a single TJPD 130, 140, 150, 160, 170, 180, 190, 300 can be placed at the entrance of the slack strand 8b meshing with the driven sprocket 6.

In yet another embodiment, a single TJPD 160, 200 is placed relative to one of the strands 8a, 8b of the chain 8.

In another embodiment, when the transfer case is installed in a horizontal position, the opposite midpoints correspond to a 12 o'clock and 6 o'clock position along a central diameter of the driven sprocket 6 and/or the drive sprocket 2. The TJPDs of the above embodiments are installed at the opposite midpoints of the driven sprocket 6 and/or the drive sprocket 2.

In another embodiment, when the transfer case is installed in a vertical position, the opposite midpoints correspond to at the 3 o'clock and the 9 o'clock of the driven sprocket 6 and/or the drive sprocket 2. The TJPDs of the above embodiments are installed at the opposite midpoints of the driven sprocket 6 and/or the drive sprocket 2.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain drive system in a transfer case, the chain drive system comprising:
   a drive sprocket;
   a driven sprocket;
   a chain connecting the drive sprocket to the driven sprocket, the chain having a slack strand between the driven sprocket and the drive sprocket and a tight strand between the driven sprocket and the drive sprocket;
   a first tooth jump protection device mounted at a first position in which the chain is tangent to the driven sprocket at a first engagement of only the driven sprocket in which the slack strand of the chain enters the driven sprocket, such that slack of the chain builds adjacent to the drive sprocket, increasing tooth jump torque of the chain drive system; and
   a second tooth jump protection device mounted at a second position in which the chain is tangent to the driven sprocket at a second engagement of the driven sprocket in which the tight strand of the chain exits the driven sprocket, such that slack of the chain builds adjacent to the drive sprocket, increasing tooth jump torque of the chain drive system, the second position opposite the first position on the driven sprocket;
   wherein the first tooth jump protection device and the second tooth jump protection device each comprises:
   a mounting bracket fixed to the transfer case; and
   a ramp connected to the mounting bracket comprising: at least an angled ramp, a first flat surface and a second flat surface, the second flat surface having a face adapted to engage the chain to maintain the chain engaged with the driven sprocket and prevent chain slack buildup on the driven sprocket and the first flat surface is perpendicular to the mounting bracket.

2. The chain drive system of claim 1, further comprising a first transition ramp between the first flat surface and the angled ramp and a second transition ramp between the second flat surface and the angled ramp.

3. The chain drive system of claim 2, further comprising a stop extending axially from the mounting bracket and aligned with the first transition ramp of the ramp.

4. A chain drive system in a transfer case mounted to an engine, the chain drive system comprising:
   a drive sprocket;
   a driven sprocket;
   a chain connecting the drive sprocket to the driven sprocket, the chain having a slack strand between the driven sprocket and the drive sprocket and a tight strand between the driven sprocket and the drive sprocket;
   a first tooth jump protection device mounted between the driven sprocket and the drive sprocket on the slack strand of the chain, with the first tooth jump protection device mounted at a position in which the chain is tangent to the driven sprocket at a first engagement of the driven sprocket in which the slack strand of the chain enters the driven sprocket, such that slack of the chain builds adjacent to the drive sprocket, increasing tooth jump torque of the chain drive system;
   wherein the first tooth jump protection is a biased snubber comprising: a body having a first end, a second end, a length between the first end and the second end, and a face adapted to contact the chain between the driven sprocket and the driving sprocket; the face extending along the length between the first end and the second end at an angle greater than 0 degrees, relative to a straight line extending from the first end to the second end parallel to the face of the biased snubber, such that the angle is between a path of the chain and the face of the biased snubber at the first engagement of the first tooth jump protection device with the driven sprocket; and the face of the biased snubber is adapted to engage the chain to maintain the chain engaged with the driven sprocket;
   a second tooth jump protection device mounted at a second position in which the chain is tangent to the driven sprocket at a second engagement of the driven sprocket in which the tight strand of the chain exits the driven sprocket, such that slack of the chain builds adjacent to the drive sprocket, increasing tooth jump torque of the chain drive system, the second position opposite the first position on the driven sprocket.

5. The chain drive system of claim 4, wherein the second tooth jump protection device comprises: a biased snubber comprising: a body having a first end, a second end, a length between the first end and the second end, and a face adapted to contact the chain between the driven sprocket and the drive sprocket; the face extending along the length between the first end and the second end at an angle relative to a straight line extending from the first end to the second end parallel to the face of the biased snubber.

6. The chain drive system of claim 4, wherein the second tooth jump protection device is mounted a distance from a centerline of the driven sprocket and with a gap relative to the tight strand of the chain at the second engagement of the driven sprocket in which the tight strand of the chain the second tooth jump protection device comprises: a snubber comprising: a body having a first end, a second end, a length between the first end and the second end, and a face adapted to contact the chain between the driven sprocket and the drive sprocket; wherein the face of the snubber is adapted to engage the chain to maintain the chain engaged with the driven sprocket and prevent chain slack buildup on the driven sprocket.

7. The chain drive system of claim 4, wherein the second tooth jump protection device comprises: a mounting bracket fixed to the transfer case; and a ramp connected to the mounting bracket comprising: at least an angled ramp, a first flat surface and a second flat surface, the second flat surface having a face adapted to engage the chain to maintain the chain engaged with the driven sprocket and prevent chain slack buildup on the driven sprocket and the first flat surface is perpendicular to the mounting bracket.

8. The chain drive system of claim 4, wherein the second tooth jump protection device comprises:
   a mounting bracket fixed to the transfer case;
   a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket; and a snubber fixed to the mounting bracket and parallel to the first flat surface of the first body portion of the ramp, the snubber having a face adapted to engage the chain between the driven sprocket and the drive sprocket;
wherein the first flat surface is perpendicular to the mounting bracket.

9. A chain drive system in a transfer case, the chain drive system comprising:
  a drive sprocket;
  a driven sprocket;
  a chain connecting the drive sprocket to the driven sprocket, the chain having a slack strand between the driven sprocket and the drive sprocket and a tight strand between the driven sprocket and the drive sprocket; and
  a first tooth jump protection device mounted between the driven sprocket and the drive sprocket on the slack strand of the chain, with the first tooth jump protection device present a first distance from a centerline of the driven sprocket and with a first gap relative to the slack strand of the chain;
  wherein the first tooth jump protection device is a snubber comprising: a body having a first end, a second end, a length between the first end and the second end, and a face adapted to contact the chain between the driven sprocket and the drive sprocket, such that the first end of the body of the first tooth jump protection device is at a first engagement of the chain with the driven sprocket in which the slack strand of the chain enters the driven sprocket at the first distance from the centerline of the driven sprocket; wherein the face of the snubber is adapted to engage the chain to maintain the chain engaged with the driven sprocket and prevent chain slack buildup on the driven sprocket;
  a second tooth jump protection device mounted at a second position of a second engagement of the driven sprocket in which the tight strand of the chain exits the driven sprocket, such that slack of the chain builds adjacent to the drive sprocket, increasing tooth jump torque of the chain drive system, the second position opposite the first position on the driven sprocket.

10. The chain drive system of claim 9, wherein the first gap between the first tooth jump protection device and the slack strand of the chain is less than 7 mm.

11. The chain drive system of claim 9, wherein the first gap between the first tooth jump protection device and the slack strand of the chain is less than 1.0 mm.

12. The chain drive system of claim 9, wherein the second tooth jump protection device is mounted a second distance from the centerline of the driven sprocket and with a second gap relative to the tight strand of the chain at the second engagement of the driven sprocket in which the tight strand of the chain exits the driven sprocket, the second tooth jump protection device comprising: a snubber comprising: a body having a first end, a second end, a length between the first end and the second end, and a face adapted to contact the chain between the driven sprocket and the drive sprocket; wherein the face of the snubber is adapted to engage the chain to maintain the chain engaged with the driven sprocket and prevent chain slack buildup on the driven sprocket.

13. The chain drive system of claim 9, wherein the second tooth jump protection device comprises: a biased snubber comprises: a body having a first end, a second end, a length between the first end and the second end, and a face adapted to contact the chain between the driven sprocket and the drive sprocket; the face extending along the length between the first end and the second end at an angle relative to a straight line extending from the first end to the second end parallel to the face of the biased snubber.

14. The chain drive system of claim 9, wherein the second tooth jump protection device comprises: a mounting bracket fixed to the transfer case; and a ramp connected to the mounting bracket comprising: at least an angled ramp, a first flat surface and a second flat surface, the second flat surface having a face adapted to engage the chain to maintain the chain engaged with the driven sprocket and prevent chain slack buildup on the driven sprocket and the first flat surface is perpendicular to the mounting bracket.

15. The chain drive system of claim 9, wherein the second tooth jump protection device comprises:
  a mounting bracket fixed to the transfer case;
  a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket; and
  a snubber fixed to the mounting bracket and parallel to the first flat surface of the first body portion of the ramp, the snubber having a face adapted to engage the chain between the driven sprocket and drive sprocket;
  wherein the first flat surface is perpendicular to the mounting bracket.

16. A chain drive system in a transfer case, the chain drive system comprising:
  a drive sprocket;
  a driven sprocket;
  a chain connecting the drive sprocket to the driven sprocket, the chain having a slack strand between the driven sprocket and the drive sprocket and a tight strand between the driven sprocket and the drive sprocket;
  a first tooth jump protection device mounted at a first position in which the chain is tangent to the driven sprocket at a first engagement of only the driven sprocket in which the slack strand of the chain enters the driven sprocket, such that slack of the chain builds adjacent to the drive sprocket, increasing tooth jump torque of the chain drive system; and
  a second tooth jump protection device mounted at a second position in which the chain is tangent to the driven sprocket at a second engagement of the driven sprocket in which the tight strand of the chain exits the driven sprocket, such that slack of the chain builds adjacent to the drive sprocket, increasing tooth jump torque of the chain drive system, the second position opposite the first position on the driven sprocket;
  wherein the first tooth jump protection device comprises: a mounting bracket fixed to the transfer case; a ramp connected to the mounting bracket comprising: at least a first flat surface, an angled ramp, and a compliant roller holder; and at least one roller mounted to the compliant roller holder adapted to engage the chain to maintain the chain engaged with the driven sprocket and prevent chain slack buildup on the driven sprocket; wherein the first flat surface is perpendicular to the mounting bracket.

17. The chain system of claim 16, wherein the second tooth jump protection device comprises: a bolt fixed to the transfer case and a rolling element rotatable around the bolt.

18. The chain drive system of claim 16, wherein the second tooth jump protection device comprises a snubber fixed to the transfer case and positioned a distance from the chain, the snubber having a body with a surface adapted to engage the chain to maintain the chain engaged with the driven sprocket and prevent chain slack buildup on the driven sprocket.

19. The chain drive system of claim 16, wherein the second tooth jump protection device comprises:
   a mounting bracket fixed to the transfer case having a pivot pin extending perpendicular therefrom;
   an arm comprising a body having a first end, a second end, a roller holder at the second end, and a hole for receiving the pivot pin at the first end; and
   at least one roller mounted to the roller holder adapted to engage the chain to maintain the chain engaged with the driven sprocket and prevent chain slack buildup on the driven sprocket; and
   a torsion spring mounted between the mounting bracket and the arm biasing the first end of the arm on the pivot pin towards the chain.

20. The chain driven system of claim 16, wherein the second first tooth jump protection device comprises:
   a mounting bracket fixed to the transfer case; and
   a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket.

21. The chain drive system of claim 20, further comprising a stop extending axially from the mounting bracket and aligned with the ramp.

22. The chain system of claim 16, wherein the second first tooth jump protection device comprises:
   a mounting bracket fixed to the transfer case;
   a ramp connected to the mounting bracket comprising: at least a first flat surface, an angled ramp, and a compliant roller holder; and
   at least one roller mounted to the compliant roller holder adapted to engage the chain to maintain the chain engaged with the driven sprocket and prevent chain slack buildup on the driven sprocket;
   wherein the first flat surface is perpendicular to the mounting bracket.

23. A chain drive system in a transfer case, the chain drive system comprising:
   a drive sprocket;
   a driven sprocket;
   a chain connecting the drive sprocket to the driven sprocket, the chain having a slack strand between the driven sprocket and the drive sprocket and a tight strand between the driven sprocket and the drive sprocket;
   a first tooth jump protection device mounted at a first position in which the chain is tangent to the driven sprocket at a first engagement of only the driven sprocket in which the slack strand of the chain enters the driven sprocket, such that slack of the chain builds adjacent to the drive sprocket, increasing tooth jump torque of the chain drive system; and
   a second tooth jump protection device mounted at a second position in which the chain is tangent to the driven sprocket at a second engagement of the driven sprocket in which the tight strand of the chain exits the driven sprocket, such that slack of the chain builds adjacent to the drive sprocket, increasing tooth jump torque of the chain drive system, the second position opposite the first position on the driven sprocket;
   wherein the first tooth jump protection device comprises:
   a mounting bracket fixed to the transfer case having a pivot pin extending perpendicular therefrom; an arm comprising a body having a first end, a second end, a roller holder at the second end, and a hole for receiving the pivot pin at the first end; and at least one roller mounted to the roller holder adapted to engage the chain to maintain the chain engaged with the driven sprocket and prevent chain slack buildup on the driven sprocket; and a torsion spring mounted between the mounting bracket and the arm biasing the first end of the arm on the pivot pin towards the chain.

24. The chain drive system of claim 23, wherein the second tooth jump protection device comprises:
   a mounting bracket fixed to the transfer case having a pivot pin extending perpendicular therefrom;
   an arm comprising a body having a first end, a second end, a roller holder at the second end, and a hole for receiving the pivot pin at the first end; and
   at least one roller mounted to the roller holder adapted to engage the chain to maintain the chain engaged with the driven sprocket and prevent chain slack buildup on the driven sprocket; and
   a torsion spring mounted between the mounting bracket and the arm biasing the first end of the arm on the pivot pin towards the chain.

25. The chain drive system of claim 23, wherein the second tooth jump protection device comprises:
   a mounting bracket fixed to the transfer case;
   a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket; and
   a snubber fixed to the mounting bracket and parallel to the first flat surface of the first body portion of the ramp, the snubber having a face adapted to engage the chain between the driven sprocket and the drive sprocket;
   wherein the first flat surface is perpendicular to the mounting bracket.

26. The chain drive system of claim 25, wherein the face of the snubber of the second tooth jump protection device includes a first pad mounted to the face of the snubber, the first pad to engage the chain and a second pad mounted to the second flat surface of the ramp.

27. The chain system of claim 23, wherein the second tooth jump protection device comprises a bolt fixed to the transfer case and a rolling element rotatable around the bolt.

28. The chain driven system of claim 23, wherein the second tooth jump protection device comprises:
   a mounting bracket fixed to the transfer case; and
   a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket.

29. The chain drive system of claim 23, wherein the second tooth jump protection device comprises a snubber fixed to the transfer case and positioned a distance from the chain, the snubber having a body with a surface adapted to engage the chain to maintain the chain engaged with the driven sprocket and prevent chain slack buildup on the driven sprocket.

30. A chain drive system in a transfer case, the chain drive system comprising:
   a drive sprocket;
   a driven sprocket;
   a chain connecting the drive sprocket to the driven sprocket, the chain having a slack strand between the driven sprocket and the drive sprocket and a tight strand between the driven sprocket and the drive sprocket;
   a first tooth jump protection device mounted at a first position in which the chain is tangent to the driven sprocket at a first engagement of only the driven sprocket in which the slack strand of the chain enters the driven sprocket, such that slack of the chain builds adjacent to the drive sprocket, increasing tooth jump torque of the chain drive system; and
   a second tooth jump protection device mounted at a second position in which the chain is tangent to the driven sprocket at a second engagement of the driven sprocket in which the tight strand of the chain exits the driven sprocket, such that slack of the chain builds adjacent to the drive sprocket, increasing tooth jump torque of the chain drive system, the second position opposite the first position on the driven sprocket;
   wherein the first tooth jump protection device comprises: a mounting bracket fixed to the transfer case; a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket; and a snubber fixed to the mounting bracket and parallel to the first flat surface of the first body portion of the ramp, the snubber having a face adapted to engage the chain between the driven sprocket and drive sprocket; wherein the first flat surface is perpendicular to the mounting bracket.

31. The chain drive system of claim 30, wherein the second tooth jump protection device comprises:
   a mounting bracket fixed to the transfer case;
   a ramp connected to the mounting bracket comprising: a first flat surface, an angled ramp and a compliant roller holder; and
   at least one roller mounted to the compliant roller holder adapted to engage the chain to maintain the chain engaged with the driven sprocket and prevent chain slack buildup on the driven sprocket; wherein the first flat surface is perpendicular to the mounting bracket.

32. The chain drive system of claim 30, wherein the second tooth jump protection device comprises:
   a mounting bracket fixed to the transfer case;
   a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket; and
   a snubber fixed to the mounting bracket and parallel to the first flat surface of the first body portion of the ramp, the snubber having a face adapted to engage the chain between the driven sprocket and the drive sprocket;
   wherein the first flat surface is perpendicular to the mounting bracket.

33. The chain drive system of claim 32, wherein the face of the snubber of the second tooth jump protection device includes a first pad mounted to the face of the snubber, the first pad to engage the chain and a second pad mounted to the second flat surface of the ramp.

34. The chain driven system of claim 30, wherein the second tooth jump protection device comprises:
   a mounting bracket fixed to the transfer case; and
   a ramp connected to the mounting bracket comprising: a first flat surface of a first body portion connected to an angled ramp of a second body portion, the angled ramp of the second body portion connected to a second flat surface, the second flat surface having a face adapted to engage the chain to maintain the chain engaged with the driven sprocket and prevent chain slack buildup on the driven sprocket.

35. The chain drive system of claim 30, wherein the second tooth jump protection device comprises a snubber fixed to the transfer case and positioned a distance from the chain, the snubber having a body with a surface adapted to engage the chain to maintain the chain engaged with the driven sprocket and prevent chain slack buildup on the driven sprocket.

* * * * *